(12) United States Patent
Koyata

(10) Patent No.: US 6,353,584 B1
(45) Date of Patent: Mar. 5, 2002

(54) REPRODUCING AND RECORDING APPARATUS, DECODING APPARATUS, RECORDING APPARATUS, REPRODUCING AND RECORDING METHOD, DECODING METHOD AND RECORDING METHOD

(75) Inventor: Tomohiro Koyata, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/310,617

(22) Filed: May 12, 1999

(30) Foreign Application Priority Data

May 14, 1998 (JP) .......................... 10-132220
May 14, 1998 (JP) .......................... 10-132221

(51) Int. Cl.⁷ .............................................. G11B 7/006
(52) U.S. Cl. ................................ 369/47.13; 369/47.16; 369/47.26
(58) Field of Search ........................ 369/47.12, 47.13, 369/47.16, 47.25–47.27, 59.15–59.16, 59.21, 59.27, 47.2–47.21, 47.35; 704/500–501, 224–225

(56) References Cited

U.S. PATENT DOCUMENTS

| | | | | |
|---|---|---|---|---|
| 5,381,143 A | * | 1/1995 | Shimoyoshi et al. |
| 5,414,795 A | * | 5/1995 | Tsutsui et al. |
| 5,454,011 A | * | 9/1995 | Shimoyoshi |
| 5,490,018 A | * | 2/1996 | Yamashita |
| 5,553,193 A | * | 9/1996 | Akagiri |
| 5,583,967 A | * | 12/1996 | Akagiri |
| 5,654,952 A | * | 8/1997 | Suzuki et al. |
| 5,856,958 A | * | 1/1999 | Yokota et al. |
| 5,926,448 A | * | 7/1999 | Yokota et al. |
| 5,999,508 A | * | 12/1999 | Yokota et al. |
| 6,058,091 A | * | 5/2000 | Yokota et al. |
| 6,061,314 A | * | 5/2000 | Arai |
| 6,088,315 A | * | 7/2000 | Ando |
| 6,130,870 A | * | 10/2000 | Yokota et al. |
| 6,154,427 A | * | 11/2000 | Yokota et al. |

OTHER PUBLICATIONS

Patent Abstracts of Japan, vol. 97, No. 2, for JP 9–46234 published Feb. 14, 1997.*

* cited by examiner

Primary Examiner—W. R. Young
(74) Attorney, Agent, or Firm—Frommer Lawrence & Haug LLP; William S. Frommer

(57) ABSTRACT

A reproducing and recording apparatus, a decoding apparatus, a recording apparatus, a reproducing and recording method, a decoding method and a recording method are provided in which a computation for changing acoustic characteristics of compressed digital data is effected on a scale factor of each divided band in the compressed digital data including spectrum data band-divided into a plurality of bands on a frequency axis and the scale factor of every divided band.

28 Claims, 15 Drawing Sheets

Long Mode

Short Mode

Middle Mode A

Middle Mode B

REPRODUCING AND RECORDING APPARATUS, DECODING APPARATUS, RECORDING APPARATUS, REPRODUCING AND RECORDING METHOD, DECODING METHOD AND RECORDING METHOD

BACKGROUND OF THE INVENTION

1. Field of the Invention

The present invention relates to a reproducing and recording apparatus, a decoding apparatus, a recording apparatus, a reproducing and recording method, a decoding method and a recording method in which acoustic characteristics of compressed digital data are changed by effecting calculation on normalized information in the compressed digital data.

2. Description of the Related Art

Heretofore, there have been a variety of audio signal high-efficiency coding methods and apparatus, and a few examples of such audio signal high-efficiency coding methods and apparatus will be described below. There is known a method called a transform coding method which is one of block frequency-band division systems in which an audio signal of a time region is blocked at every unit time, a signal of a time axis of every block is transformed into a signal on a frequency axis, i.e. quadrature-transformed and then coded at every band. Also, there is known a method called an SBC (Sub Band Coding) method which is one of non-block frequency band division methods in which an audio signal of time region is not blocked at every time unit but divided into a plurality of frequency bands thereby coded. Further, there is known a high-efficiency coding method which is a combination of the above-mentioned band division coding method and the transform coding method. In that case, after the band is divided by the above-mentioned band division coding system, the signal of every band is quadrature-transformed into a signal of a frequency region by the above-mentioned transform coding system, and the coding is effected at very orthogonal-transformed band.

As a band-division filter used in the above-mentioned band division coding system, there is known a filter such as QMF (Quadrature Mirror filter). This QMF is described in 1976 E. E. Crochiere Digital coding speed in subbands Bell Syst. Tech. J. Vol. 55, No. 8. 1976. Also, ICASSP 83, BOSTON Polyphase Quadrature filters—A new subband coding technique Joseph H. Rothweiler describes equal band width filter dividing method and apparatus such as PQF (Polyphase Quadrature filter).

Also, as the above-mentioned quadrature transform, there is known a quadrature transform in which an input audio signal is blocked at a predetermined unit time (frame) and the time axis is transformed into the frequency axis by effecting FFT (Fast Fourier Transform) or DCT (Discrete Cosine Transform) or MDCT (Modified Discrete Cosine Transform). The above-mentioned MDCT is described in ICASSP 1098 Subband/Transform Coding Using Filter Bank Designs Based on Time Domain Aliasing Cancellation J. P. Princen A. B. Bradley Univ. of Surrey Royal Melbourne Inst. of Tech.

Further, as a frequency dividing width used when each frequency-band-divided frequency component is quantized, there is known a band division considering man's auditory characteristics. That is, in a band width in which the band width is widened in the high band on the frequency axis called a critical band, an audio signal is divided into a plurality of bands, e.g. 25 bands. When data of every band of this time is encoded, the encoding is executed by a predetermined bit distribution of every band or adaptive bit distribution of every band. For example, when MDCT coefficient data of every band obtained by the MDCT processing is encoded by the bit distribution, the encoding is executed by the adaptive distribution bit number.

Further, in the case of the encoding at every band, data is normalized at every band and quantized, thereby effecting a so-called block floating processing in which a more efficient encoding can be realized. For example, when the MDCT coefficient data obtained by the above-mentioned MDCT processing is encoded, data is normalized in response to the maximum value of the absolute value of the above-mentioned MDCT coefficient at every band and quantized, thereby making it possible to execute the more efficient encoding. In the normalization, there are in advance determined a plurality of numbers corresponding to size information, and the numbers are used as normalization information. The size information of the previously-determined normalization is numbered at an interval of a constant magnitude.

As the bit distribution method and apparatus therefor, there have been heretofore known the following two methods.

In the IEEE Transactions of Acoustics, Speech, and Signal Processing, vol. ASSP-25, No. 4, August 1977, bits are distributed on the basis of the magnitude of the signal of every band. Further, in the ICASSP 1980 The critical band coder—digital encoding of the perceptual requirements of the auditory system M. A. Kransner MIT, there is described a method in which a signal-to-noise ratio necessary for every band is obtained by using an auditory masking and bits are distributed in a fixed fashion.

A signal high-efficiency coded by the above-mentioned method is decoded by the method which follows. Initially, the high-efficiency coded signal is calculated as MDCT coefficient data by using bit distribution information of every band, normalization information or the like. The MDCT coefficient data is transformed into data of time region by so-called IMDCT. When data is band-divided by the band-dividing filter upon encoding, data are further synthesized by using a band-synthesizing filter. By the above-mentioned operation, data of the original time region is decoded.

With respect to the signal of the time region which results from decoding the high-efficiency coded signal, let it be considered that the magnitude of the amplitude, i.e. reproduction level is adjusted and that a filter processing which is the level adjustment of every band is executed. When the reproduction level is adjusted, such adjustment is realized by effecting multiplication, addition or subtraction of a constant amount of the signal component of the time region which is not yet encoded fundamentally or the signal component which is decoded to the time region. Further, when the filter processing is executed, such filter processing is realized by a so-called convolutional computation or a combination of delay circuits and multipliers. In both cases, there are required a plurality of multipliers, adders, delay circuits and the like so that the processing process increases.

Also, there is considered a method in which the reproduction level is adjusted by MDCT coefficient data of the MDCT frequency region and the filter is realized by further adjusting the level. With respect to this method, there are required multipliers or adders or multiplication using the subtracter or addition or subtraction of the number corresponding to the number of the MDCT coefficient data so that the processing process increases.

Further, a similar problem arises when the high-efficiency coded signal is recorded on a certain recording medium and the signal of the time region in which the recorded signal is decoded is re-recorded in such a manner that information is changed such that the magnitude of the amplitude, i.e. reproduction level is changed or when information is re-recorded under the condition that information is changed in the form of being processed by the so-called filter effect. In particular, when the reproduction level is adjusted in the time region and the adjusted result is re-recorded on the recording medium, the IMDCT and the MDCT should be executed so that a quality is deteriorated by computation error or the like.

A similar problem arises when a filter processing is realized by the transform to the analog region.

When an analog audio signal is processed by filter processing such as a low-pass filter, a buzz-boost filter, a bandpass filter, a high-pass filter or the like, so-called effect processing, there has heretofore been required a special processing IC.

Also, in order to effect the filter processing on a part of audio signal, after a high-efficiency coded digital audio signal is expanded and a part of the expanded audio signal is processed by a filter processing, a resultant audio signal cannot be high-efficiency coded.

SUMMARY OF THE INVENTION

In view of the aforesaid aspect, it is a first object of the present invention to provide a reproducing and recording apparatus, a decoding apparatus, a recording apparatus, a reproducing and recording method, a decoding method and a recording method in which an adjustment of reproduction level of a signal of a time region in which a high-efficiency coded signal is decoded can be realized by smaller processing process.

It is a second object of the present invention to provide a reproducing and recording apparatus, a decoding apparatus, a recording apparatus, a reproducing and recording method, a decoding method and a recording method in which a signal of a time region in which a high-efficiency coded signal is recorded on a certain recording medium and the recorded signal is decoded can be re-recorded by smaller processing process while the reproduction level is changed and a quality can be prevented from being deteriorated when a computation such as IMDCT and MDCT is executed.

It is a third object of the present invention to provide a reproducing and recording apparatus, a decoding apparatus, a recording apparatus, a reproducing and recording method, a decoding method and a recording method in which a filter processing on a signal of a time region in which a high-efficiency coded signal is decoded can be realized by smaller processing process and simple arrangement and in which a filter processing of an arbitrary portion with respect to the time region signal becomes possible.

It is a fourth object of the present invention to provide a reproducing and recording apparatus, a decoding apparatus, a recording apparatus, a reproducing and recording method, a decoding method and a recording method in which a signal of a time region in which a high-efficiency coded signal is recorded on a certain recording medium and the recorded signal is decoded can be re-recorded by smaller processing process and simple arrangement while information is changed in the form of information with a filter effect achieved thereon, a filter processing of an arbitrary portion with respect to the time region signal becomes possible and in which a quality can be prevented from being deteriorated when a computation such as IMDCT and MDCT is executed.

According to an aspect of the present invention, there is provided a reproducing and recording apparatus which is comprised of data read means for reading compressed digital data including spectrum data whose band is divided into a plurality of bands on a frequency axis and a scale factor of every divided band from a recording medium, computation means for receiving compressed digital data including the band-divided spectrum data and the scale factor of every divided band from the data read means and effecting a computation for changing acoustic characteristics of the compressed digital data, and recording means for re-recording the compressed digital data whose acoustic characteristics are changed when the computation means computes the scale factor of the every band on the recording medium.

According to another aspect of the present invention, there is provided a decoding apparatus which is comprised of computation means for receiving compressed digital data including spectrum data which is band-divided into a plurality of bands on a frequency axis and a scale factor of every divided band and effecting a predetermined computation on the scale factor of the every divided band, normalization means for normalizing the band-divided spectrum data contained in the compressed digital data based on the scale factor of the every divided band computed by the computation means, IMDCT means for obtaining band-divided digital data on a time axis by processing the band-divided spectrum data normalized by the normalization means in an IMDCT fashion, and band-synthesizing means for band-synthesizing the digital data on the time axis band-divided by the IMDCT means.

According to other aspect of the present invention, there is provided a recording apparatus which is comprised of MDCT means for processing an inputted digital signal on a time axis in a MDCT fashion to provide spectrum data on a frequency axis, scale factor calculating means for calculating a scale factor of every divided band for normalization by band-dividing the spectrum data on the frequency axis, data compressing means for providing compressed data including a scale factor of every divided band and spectrum data by compressing the spectrum data on the frequency axis calculated by the scale factor calculating means, computation means for receiving compressed digital data including the scale factor of the every divided band and spectrum data from the data compressing means and effecting a computation for changing acoustic characteristics of the compressed digital data on the scale factor of the every divided band, and recording means for recording the compressed digital data in which acoustic characteristics are changed when the computation means computes the scale factor of the every band on a recording medium.

According to a further aspect of the present invention, there is provided a reproducing and recording method which comprises the steps of reading compressed digital data including spectrum data on a frequency axis band-divided and a scale factor of every divided band from a recording medium, effecting a computation for changing acoustic characteristics of the compressed digital data on the scale factor of the every divided band in compressed digital data including the read out spectrum data on the frequency axis band-divided and the scale factor of every divided band, and re-recording the compressed digital data whose acoustic characteristics are changed on the recording medium by computing the scale factor of the every band.

According to yet a further aspect of the present invention, there is provided a decoding method which comprises the steps of effecting a predetermined computation on the scale factor of every divided band in compressed digital data including spectrum data on a frequency axis band-divided into a plurality of bands and the scale factor of every divided band, normalizing the band-divided spectrum data in the compressed digital data based on the computed scale factor of the every divided band, providing digital data on a time axis band-divided by processing the normalized band-divided spectrum data in an IMDCT fashion, and band-synthesizing digital data on the time axis band-divided.

In accordance with still a further aspect of the present invention, there is provided a recording method which comprises the steps of transforming an inputted digital signal on a time axis into spectrum data on a frequency axis in an MDCT fashion, calculating a scale factor of every divided band for normalization by band-dividing spectrum data on the frequency axis into a plurality of bands, providing compressed digital data including a scale factor of every divided band and spectrum data by compressing the band-divided spectrum data on the frequency axis in response to the calculated scale factor of every divided band, receiving compressed digital data including the scale factor of the every divided band and spectrum data and effecting a computation for changing acoustic characteristics of the compressed digital data on the scale factor of the every divided band, and recording the compressed digital data whose acoustic characteristics are changed on a recording medium by computing the scale factor of the every band.

DESCRIPTION OF THE PREFERRED EMBODIMENTS

Preferred embodiments of the present invention will hereinafter be described with reference to the drawings.

In the preferred embodiment of the present invention, an input digital signal such as an audio PCM (Pulse Code Modulation) signal is high-efficiency-coded by technologies such as SBC (Sub Band Coding), ATC (Adaptive Transform Coding) and adaptive bit assignment. These technologies will be described with reference to FIG. 1 and the following sheets of drawings.

In a specific example of a high-efficiency coding apparatus shown in FIG. 1, an input digital signal is divided into a plurality of frequency bands and spectrum data of obtained frequency axis obtained by quadrature-transforming each frequency band is encoded by adaptively assigning bits at every critical band, which will be described later on, in the low-frequency band and at every band which results from further dividing the critical band in the middle and high frequency band in consideration of a block coding effectiveness. In general, the above-mentioned respective blocks independently become blocks which generate a quantization noise. Further, in the preferred embodiments of the present invention, prior to the quadrature-transform, the block size, i.e. block length is adaptively changed in response to the input signal.

Figure 1:
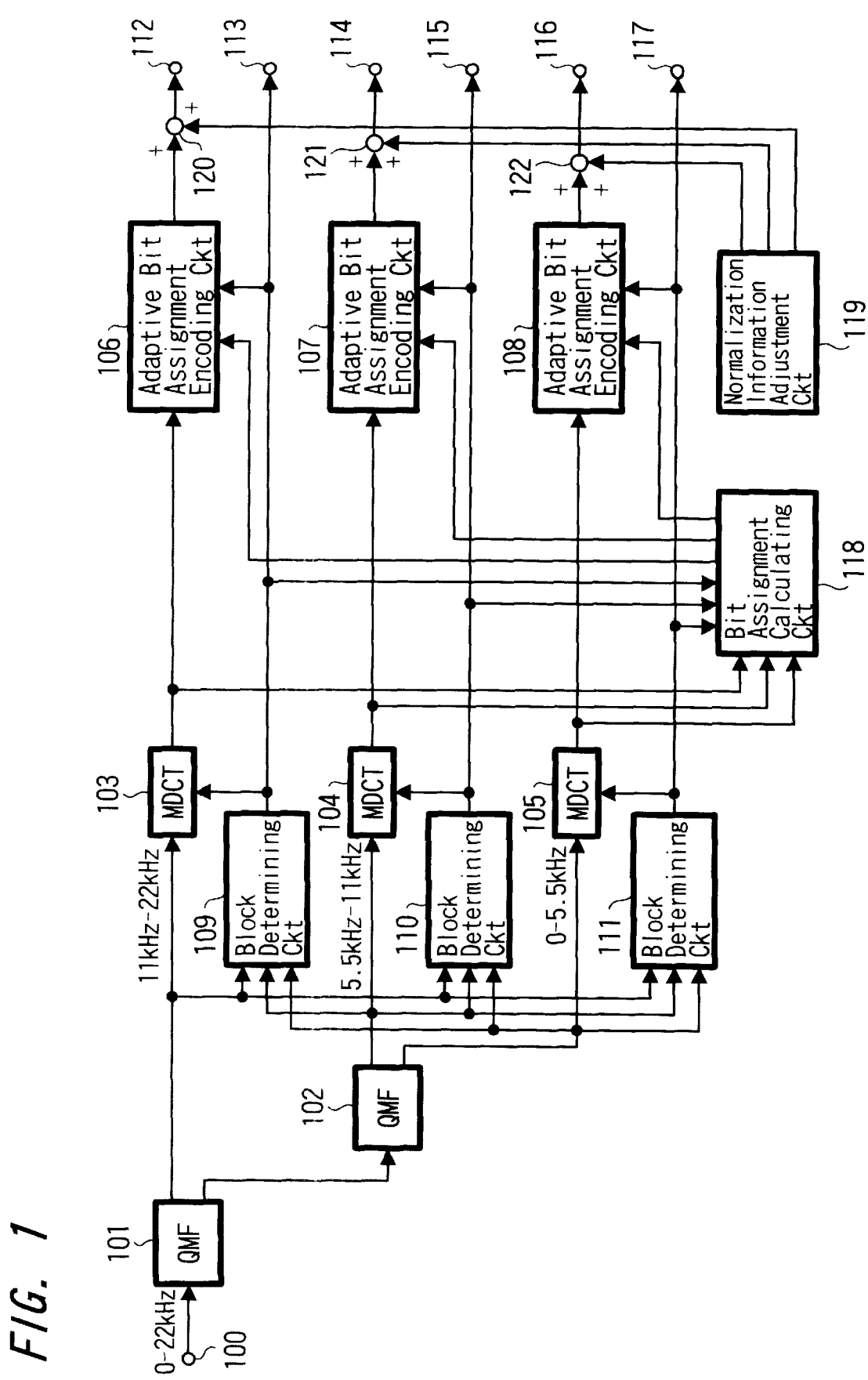
FIG. 1 is a block diagram showing a high-efficiency coding encoder for use in bit-rate-coding as a specific example according to the present invention.
Figure 2A:
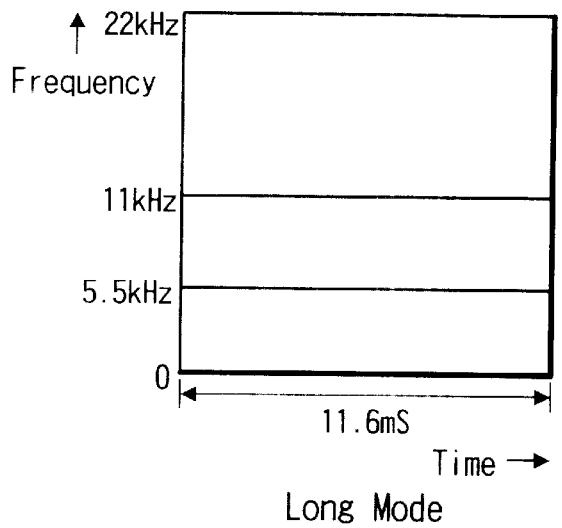
FIG. 2A is a diagram showing a long mode which is an example of a structure of a quadrature transform block used in bit compression.
Figure 2B:
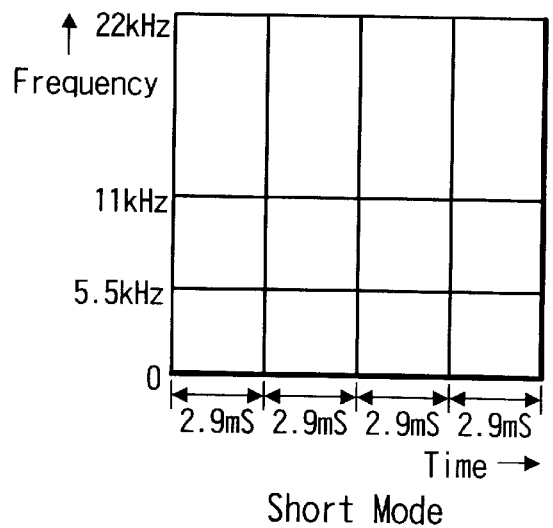
FIG. 2B is a diagram showing a short mode which is an example of a structure of a quadrature transform block used in bit compression.
Figure 2C:
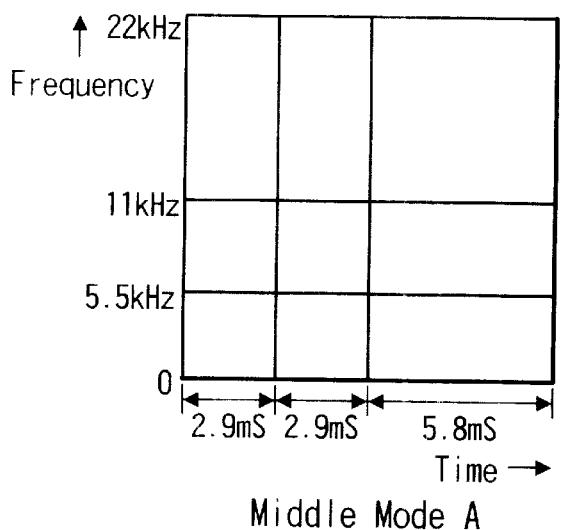
FIG. 2C is a diagram showing a middle mode A which is an example of a structure of a quadrature transform block used in bit compression.
Figure 2D:
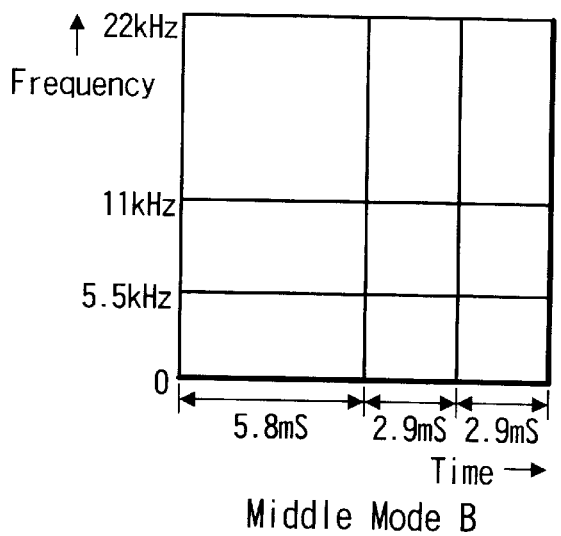
FIG. 2D is a diagram showing a middle mode B which is an example of a structure of a quadrature transform block used in bit compression.

Specifically, as shown in FIG. 1, when a sampling frequency is 44.1 kHz, for example, an audio PCM signal having a frequency of 0 to 22 kHz is supplied to an input terminal 100. This input signal is divided into 0 to 11 kHz band and 11 kHz to 22 kHz band by a band-dividing filter 101 such as a QMF (Quadrature Mirror Filter). The signal having the band ranging from 0 to 11 kHz is divided by a band-dividing filter 102 such as QMF filter into 0 to 5.5 kHz band and 5.5 kHz to 11 kHz band. Incidentally, 5.5 kHz, 11 kHz, 22 kHz are obtained by omitting two decimal place for simplicity. This is also true in the description which follows.

The signal of 11 kHz to 22 kHz band from the band-dividing filter 101 is supplied to an MDCT (Modified Discrete Cosine Transform) circuit 103 which is an example of the quadrature transform circuit. The signal having 5.5 kHz to 11 kHz band from the band-dividing filter 102 is supplied to an MDCT circuit 104, and the 0 to 5.5 kHz band signal from the band-dividing filter 102 is supplied to an MDCT circuit 102, in which they are MDCT-processed. The MDCT circuits 103, 104, 105 execute the MDCT processing based on block sizes determined by block determining circuits 109, 110, 11 provided at everybands. The block size is referred to as a block length, and refers to a width on each time axis divided when the time axis is divided in the quadrature transform.

FIGS. 2A, 2B, 2C, 2D show specific examples of standard input signals of block of every band supplied to the respective MDCT circuits 103, 104, 105. In the above-mentioned specific examples, three divided filter output signals have independently a plurality of quadrature transform block sizes of every band and their time resolutions are switched based on a time characteristic of time and a frequency distribution or the like. In the case of a signal having no sudden large level fluctuation, as shown by the long mode in FIG. 2A, the quadrature transform block size is as large as 11.6 ms. In the case of a signal having a sudden large level fluctuation, the quadrature transform block size is further divided by two or four. As shown by the short mode in FIG. 2B, when the quadrature transform is all divided by four and the block size is 2.9 ms or as shown by the middle mode A in FIG. 2C or as shown by the middle mode B in FIG. 2D, when a part thereof is divided by two and the block size is 5.8 mS or when a part thereof is divided by four and the time resolution is 2.9 mS, it becomes possible to cope with a complex in put signal in actual practice. In the division of the quadrature transform block size, if the quadrature transform block size is further divided as long as the scale of the processing apparatus can be permitted, then the division of the quadrature transform block size becomes more effective. The block size is determined by block size determining circuits 109, 110, 111 shown in FIG. 1, supplied to the MDCT circuits 103, 104, 105 and a bit assignment calculating circuit 118 and outputted from output terminals 113, 115, 117 as block size information of the corresponding blocks.

Referring back to FIG. 1, in spectrum data on frequency axis obtained by the MDCT processing in the MDCT circuits 103, 104, 105 or MDCT coefficient data which are signal components within two-dimensional block concerning time and frequency, the low band components are supplied at every critical band to adaptive bit assignment encoding circuits 106, 107, 108 and a bit assignment calculating circuit 118 and middle band components are further divided in critical band width considering an effectiveness of block floating to the adaptive bit assignment encoding circuits 106, 107, 108 and the bit assignment calculating circuit 118. The above-mentioned critical band is a frequency band divided considering man's auditory characteristics and a band which has a noise generated when a pure sound is masked by a narrow band band noise of the same intensity close to the frequency of the pure sound. The band width of the critical band is increased in the high frequency band, and the whole frequency band of 0 to 22 kHz is divided into 25 critical bands, for example. The bit assignment calculating circuit 118 in FIG. 1 calculates the masking amount of every divided band considering the effectiveness of the critical band and the block floating, energy of every divided band or peak value or the like considering a so-called masking effect or the like based on the above-mentioned block size information, spectrum data or MDCT coefficient data. Then, the bit assignment calculating circuit 118 calculates the assignment bit number, i.e. bit distribution amount at every divided band based on calculated results, and transmits the bit distribution amount to the adaptive bit assignment encoding circuits 106, 107, 108 shown in FIG. 1. These adaptive bit assignment encoding circuits 106, 107, 108 effect re-quantization in which spectrum data or MDCT coefficient data is quantized by normalization in response to the bit number assigned at every divided band considering the block size information, the critical band and the effectiveness of block floating. The data thus encoded are outputted through output terminals 112, 114, 116 shown in FIG. 1. For convenience sake of the following description, each divided band considering the critical band and the effectiveness of the block floating is referred to as a unit block.

Figure 3:
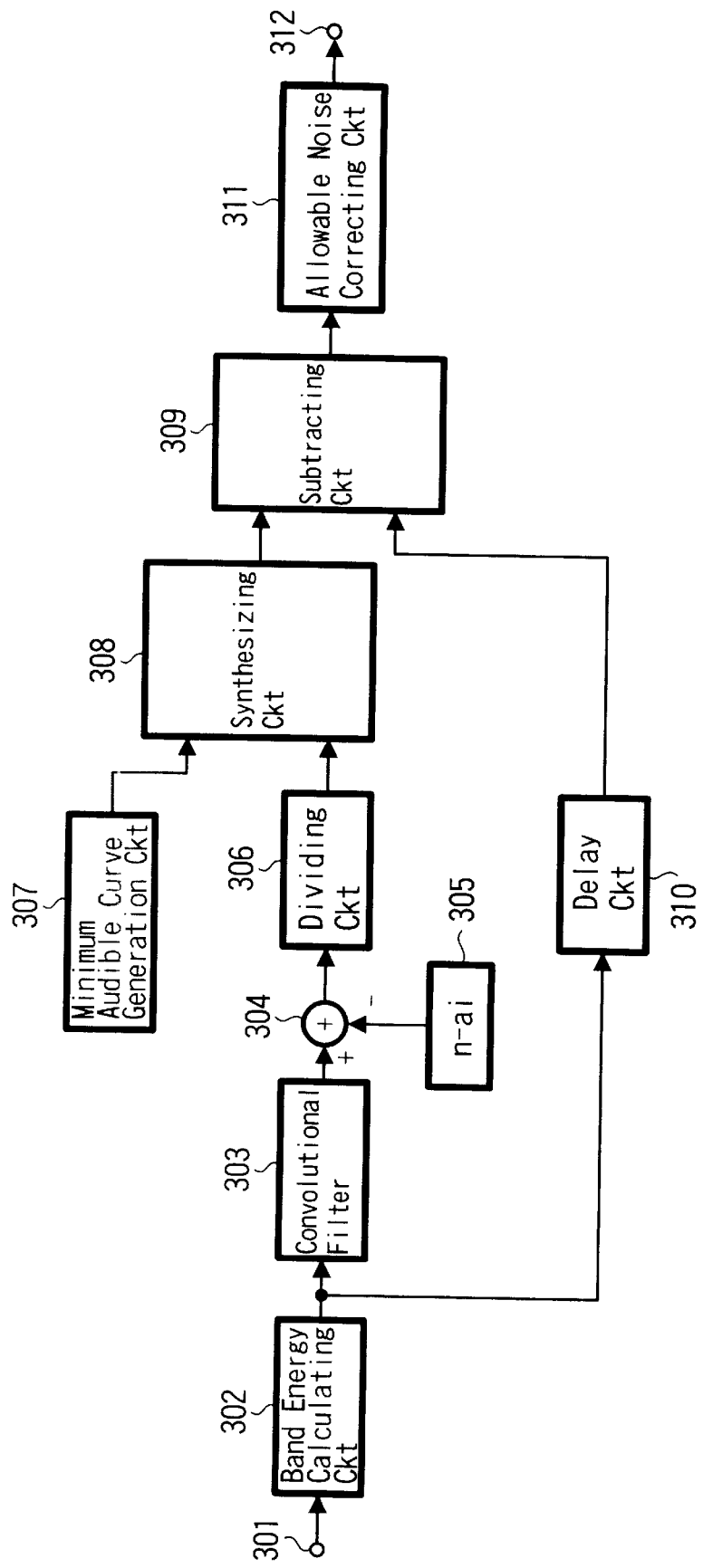
FIG. 3 is a block diagram showing an example of a bit assignment calculating circuit.

A specific method of bit assignment executed in the bit assignment calculating circuit 118 shown in FIG. 1 will be described next. FIG.3 is a block diagram showing a specific example of the bit assignment calculating circuit 118 shown in FIG. 1.

Figure 4:
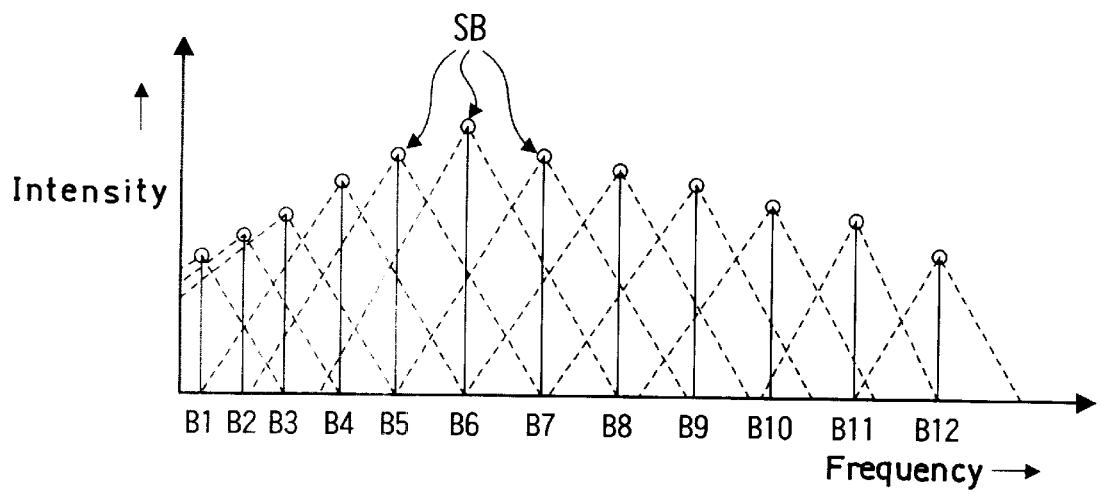
FIG. 4 is a diagram showing a spectrum of a band divided in consideration of each critical band and a block floating.

As shown in FIG. 3, the spectrum data on the frequency axis from the MDCT circuits 103, 104, 105 shown in FIG. 1 and the block size information from the block determining circuits 109, 110, 111 shown in FIG. 1 are supplied to an input terminal 301. Hereinafter, as shown in FIG. 3, the bit assignment calculating circuit 118 executes the processing by using the constants, the weighting functions or the like adaptive to the above-mentioned block size information. As shown in FIG. 3, the spectrum data on the frequency axis or the MDCT coefficient inputted from the input terminal 301 is supplied to a band energy calculating circuit 302 which obtains energy of every unit block by calculating a total sum of amplitude values within the unit block, for example. It is frequently observed that instead of the energy of every block, a peak value, a mean value or amplitude values or the like may be used. As the output from this energy calculating circuit 302, FIG. 4 shows a spectrum of a sum total value of respective bands, for example, as SB. However, in FIG. 4, for simplicity, the divided numbers of the unit block are expressed by 12 blocks comprising B1 to B12. Also, the energy calculating circuit 302 determines normalized data showing the block floating state of the unit block, i.e. scale factor value which the band-compression parameter. Specifically, several positive values are prepared as nominated values of the scale factor values in advance. Of these positive values, i.e. of values larger than the maximum value of the absolute value of the spectrum data or MDCT coefficient within the unit block, the minimum value is set to the scale factor value of the unit block. The scale factor value is numbered by using several bits in the form corresponding to the practical value. The above-mentioned number is stored in a ROM (read-only memory) or the like. The scale factor values with numbers corresponding to the actual values are defined to have values at the interval of 2 dB in the above-mentioned sequential order. In the scale factor values determined by the above-mentioned method in a certain unit block, the above-mentioned number corresponding to the determined value is used as sub-information indicating the scale factor of the unit block.

Then, to consider the influence generated in the so-called masking of the spectrum SB obtained by the above-mentioned energy calculating circuit 302, there is executed a convolution processing in which a predetermined weighting function is multiplied with and added to the spectrum SB. To this end, the output from the energy calculating circuit 302 of every band, i.e. respective values of the spectrum SB are supplied to a convolution filter circuit 303. The convolution filter circuit 303 comprises a plurality of delay elements for sequentially delaying inputted data, a plurality of multipliers for multiplying the outputs from these delay elements with weighting coefficient, which is the filter coefficient, and a sum total adder for calculating a sum total of the outputs from the respective multipliers. By this convolution processing, there is obtained a sum total of the portions shown by dotted lines in FIG. 4.

The output from the convolution filter circuit 303 is supplied to a subtracter 304. The subtracter 304 calculates a level α corresponding to an allowable noise level, which will be described later on, in the convoluted region. The level a corresponding to the above-mentioned allowable noise level, i.e. permissible noise level is changed to the allowable noise level of every band of the critical band by effecting the inverse convolution processing as will be described later on. The above-mentioned subtracter 304 is supplied with an admissible function for obtaining the above-mentioned level α, i.e. function for expressing the masking level. The above-mentioned level α can be varied by increasing or decreasing the numerical value in the above admissible function. The admissible function is supplied from a (n-ai) function generating circuit 305 which will be described next.

That is, the above-mentioned level α is obtained by the following equation (1) if i is the number sequentially supplied from the low band of the band of the critical band.

$$\alpha = S - (n - ai) \quad (1)$$

In the equation (1), n and a are constants and a >0. S is the intensity of the convoluted spectrum, and (n-ai) in the equation (1) becomes the admissible function. By way of example, n=38 and a=1 can be used.

The level a is obtained as described above. The thus obtained level α is transmitted to a dividing circuit 306. The dividing circuit 306 is used to inverse-convolute the level α in the above-mentioned convoluted region. When the inverse convolution processing is executed by the dividing circuit 306, an admissible noise spectrum is obtained from the above-mentioned level α. The admissible noise spectrum is the masking spectrum. To be more precisely, although the inverse convolution processing requires a complex computation, in the specific example of the present invention, the inverse convolution processing is executed by using the simplified dividing circuit 306.

Figure 5:
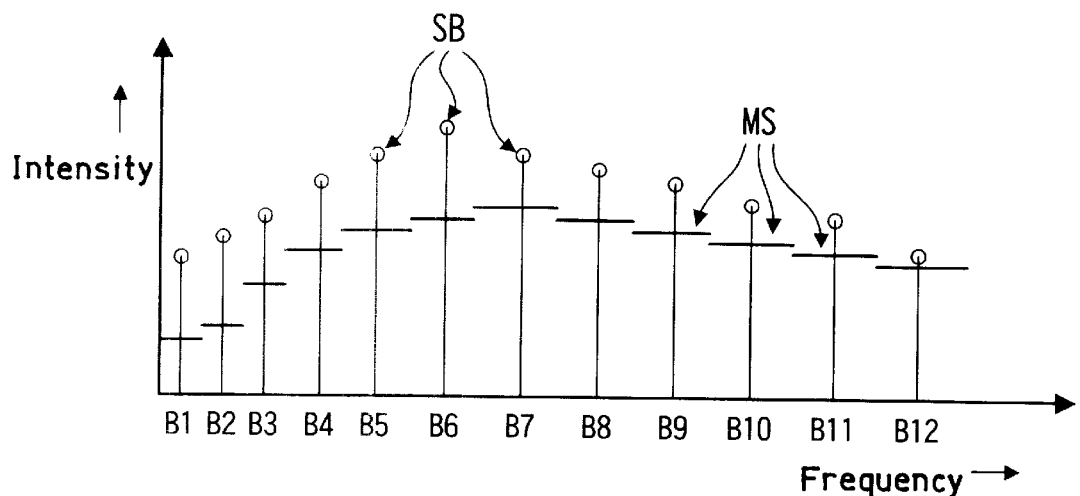
FIG. 5 is a diagram showing a masking spectrum

Next, the above-mentioned masking spectrum is transmitted through a synthesizing circuit 308 to a subtracting circuit 309. The output from the energy detecting circuit 302 of every band, i.e. the aforementioned spectrum SB is supplied through a delay circuit 310 to the subtracting circuit 309. Accordingly, the subtracting circuit 309 subtracts the masking spectrum and the spectrum SB so that, as shown in FIG. 5, in the spectrum SB, the level lower than the level of the masking spectrum MS is masked.

Figure 6:
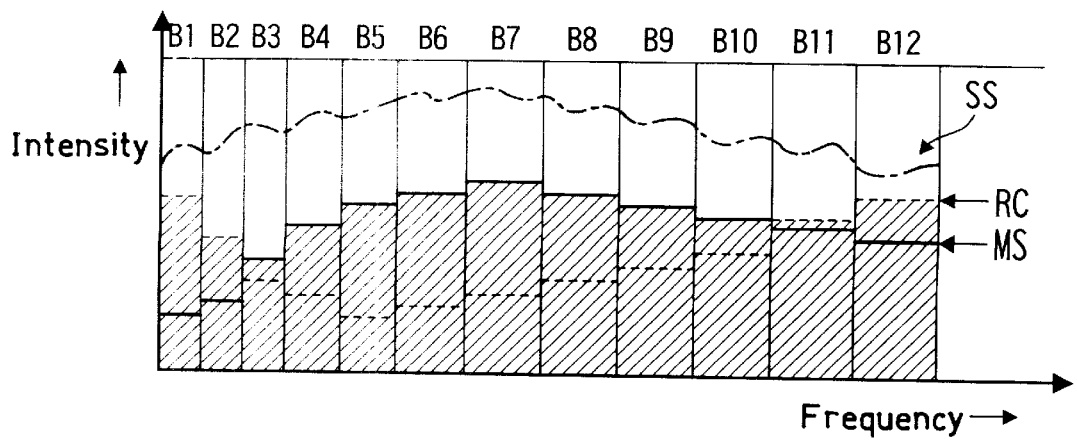
FIG. 6 is a diagram showing results obtained when the minimum audible curve and the masking spectrum are synthesized.

When the above-mentioned synthesizing circuit 308 executes the synthesis, data indicating a so-called minimum audible curve which is man's auditory characteristic, shown in FIG. 6, supplied from the minimum audible curve generating circuit 307 and the above-mentioned masking spectrum MS can be synthesized. In this minimum audible curve, if the noise absolute level is lower than this minimum audible curve, then such noise cannot be heard. Although this minimum audible curve becomes different depending on the difference of reproduction volume upon reproduction, for example, even when the coding is the same, in the real digital system, the minimum audible curve is not fluctuated so much in a music software such as commercially-available CD from a dynamic range of 16 bits. Therefore, if the quantization noise of the frequency band close to 4 kHz which is most audible cannot be heard, then it is considered that the quantization noise less than the level of this minimum audible curve cannot be heard in other frequency bands. Accordingly, if a noise near 4 kHz of the word length of the system, for example, cannot be heard and an admissible noise level, i.e. admissible quantization coefficient is obtained by synthesizing this minimum audible curve RC and the masking spectrum MS, the admissible noise level of this case can be reached to the portion shown by hatch in FIG. 6. Incidentally, in the specific example, the level of 4 kHz of the above-mentioned minimum audible curve is made coincident with the lowest level equivalent to 20 bits, for example. Also, FIG. 6 show a signal spectrum SS at the same time.

After the subtracting processing executed by the subtracting circuit 309, the admissible noise level in the output from the subtracting circuit 309 is corrected based on information of equal loudness curve, for example. Here, the equal loudness curve is the characteristic curve concerning man's auditory characteristics and is obtained by connecting curves of sound pressures of sounds at the respective frequencies whose loudness is the same as that of the pure sound of 1 kHz, for example. The equal loudness curve is also referred to as an equal sensitivity curve of loudness. Also, this equal loudness curve draws a curve substantially the same as that of the minimum audible curve RC shown in FIG. 6. In this equal loudness curve, at the frequency near 4 kHz, if the sound pressure is lower than that of 1 kHz by 8 to 10 dB, it can be heard with the same loudness as that of 1 kHz. Conversely, at the frequency near 50 Hz, if the sound pressure is larger than the of 1 kHz by about 15 dB, it can be heard with the same loudness as that of 1 kHz. Therefore, it is to be appreciated that the admissible coefficient, which the noise exceeding the level of the above-mentioned minimum audible curve, i.e. admissible noise level may have the frequency characteristic obtained by the curve corresponding to the equal loudness curve. As described above, to correct the above-mentioned admissible noise level in consideration of the equal loudness curve is matched with man's auditory characteristic. Owing to a series of processing executed so far, the admissible noise correction circuit 311 calculated the assignment bits relative each unit block based on various parameter such as the masking and the auditory characteristic.

Data outputted from this admissible noise correction circuit 311 is outputted from an output terminal 312 as an output of the bit assignment calculation circuit 118 shown in FIG. 1.

That is, in the bit assignment calculation circuit 118 shown in FIG. 1, the system shown in FIG. 3 outputs data in which MDCT output spectrum is processed by sub-information as main information and outputs scale factor indicating state of block floating and word length indicating word length as sub-information. Based on the above-mentioned data, the scale factor and the word length, the adaptive bit assignment encoding circuits 106, 107, 108 execute the re-quantization in actual practice, and encode data in accordance with the encoding format.

The normalization information adjustment circuit 119 will be described. As described above, with respect to the scale factor value which is normalization data, there are prepared in advance several positive values as nominated scale factor values. Of these positive values, the minimum value in the values greater than the maximum value of the absolute value of the spectrum data or MDCT coefficient within the unit block is set to the scale factor value of the corresponding unit block. The above-mentioned scale factor value is numbered by using several bit in the form corresponding to the actual values. The above-mentioned number is used as sub-information indicating the scale factor of the corresponding unit block. The scale factor values corresponding to the numbered actual values are defined so as to have values at an interval of 2 dB in the sequential order of the above-mentioned numbers. Accordingly, by changing the above-mentioned number which is sub-information indicating the scale factor, it is possible to adjust the level of the corresponding unit block by 2 dB each. The normalization information adjustment circuit 119 is the circuit which instructs and outputs numerical values for executing this level adjustment at every two-dimensional blocks. Moreover, the adders 120, 121, 122 are adders for adding the numerical values from the normalization information adjustment circuit 119 to the above-mentioned numbers which are sub-information indicating the scale factor of the unit block. When the numerical value outputted from the normalization information adjustment circuit 119 is negative, the adders 120, 121, 122 act as subtracters.

That is, the level adjustment of 2 dB each becomes possible by adding and subtracting all the same values of the normalization information adjustment circuit 119 to and from the normalization information of all unit blocks. Further, numerical values are outputted from the normalization information adjustment circuit 119 at every two-dimensional block and added to and subtracted from the block which is to be adjusted in level, the level adjustment of 2 dB each becomes possible independently at every two-dimensional blocks.

The level adjustment is executed independently at every two-dimensional blocks as described above, thereby making it possible to realize a filter effect.

Incidentally, the added and subtracted results are limited such that they are confined within the range of the scale factor determined by the format.

Then, the data encoding format in which the encoding is executed in actual practice will be described with reference to FIG. 7. Numerical values shown on the left of FIG. 7 indicate byte numbers, and in this embodiment, 212 bytes are set to the unit of one frame.

At the position of the zero-th byte positioned at the starting portion, there are recorded block size information of respective bands determined by the block determining circuits 109, 110, 111 in FIG. 1.

At the position of the first byte, there are recorded information of the number of recorded unit blocks or the like. For example, in the bit assignment calculating circuit, it is frequently observed that the higher band need not be recorded. Concurrently therewith, by decreasing the number of recorded unit blocks, the bit assignment of the high band is decreased to zero, and many bits are assigned to middle and low bands which are considerably affected from an auditory sense standpoint. Moreover, at the position of the first byte, there are recorded the number of unit blocks in which bit assignment information is written in a dual writing fashion and the number of unit blocks in which scale factor information is written in a dual writing fashion. The dual writing is a method in which the same data as the data recorded at a certain byte position is recorded on other place for error-correction. Although a strength against error increases in accordance with the increased number of dual writing information, the number of bits that can be used in spectrum data can be decreased. Although the strength against error decreases in accordance with the decreased number of this dual writing information, the number of bits used in the spectrum data can be increased. The strength against errors and the number of bits that can be used in the spectrum data can be adjusted by setting the number of unit blocks in which the dual writing is independently effected on the above-mentioned bit assignment information and the scale factor information. Incidentally, with respect to each information, the correspondence between the code within the determined bit and the number of the unit block is determined in advance as a format. Specifically, as shown in FIG. 8, for example, of 8 bits at the first byte shown in FIG. 7, 3 bits are set to information indicating the number of unit blocks that are recorded in actual practice, 2 bits of the remaining 5 bits are set to information indicating the number of unit blocks in which bit assignment information is written in a dual writing fashion, and the remaining 3 bits are set to information indicating the number of unit blocks in which the scale factor is written in a dual writing fashion.

Figure 7:
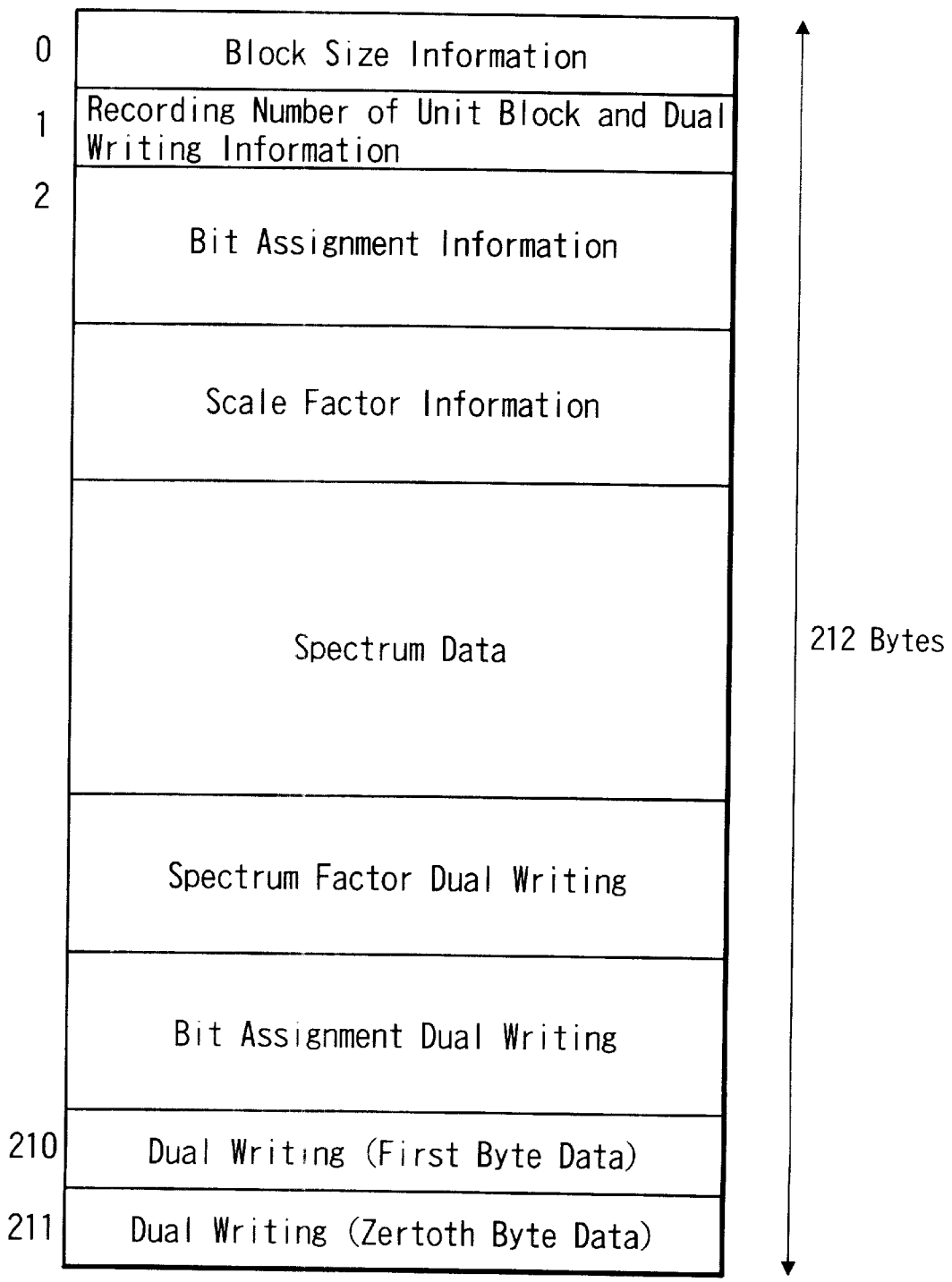
FIG. 7 is a diagram showing the manner in which data is coded.
Figure 8:
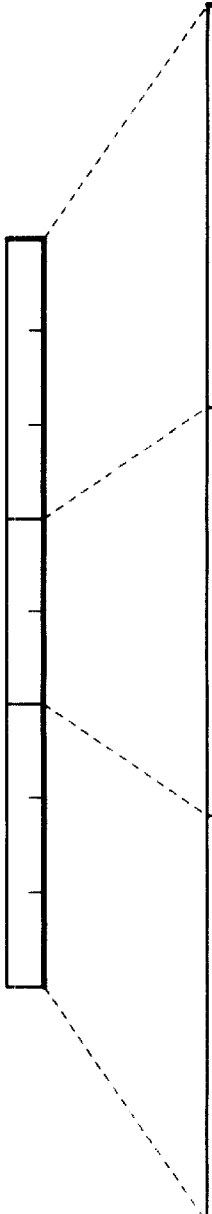
FIG. 8 is a diagram showing details of first byte data in FIG. 7.

At the position of the two bytes in FIG. 7, there is recorded the bit assignment information of the unit block. With respect to the recording of the bit assignment information, there is determined a format in which 4 bits, for example, are used to one unit block. Thus, there are recorded bit assignment information of the number of unit blocks that are recorded in actual practice in FIG. 7 in the sequential order of the zero-th unit block.

The scale factor information of unit block is recorded behind the data of the bit assignment information recorded by the above-mentioned method. With respect to the recording of scale factor information, there is determined a format in which 6 bits, for example, are used to one unit block. Thus, exactly similarly to the recording of the bit assignment information, there are recorded bit assignment information of the number of unit blocks that are recorded in actual practice in the sequential order of the zero-th unit block.

Spectrum data of unit block is recorded behind the scale factor information thus recorded. With respect to the spectrum data, there are recorded spectrum data of the number of unit blocks that are recorded in actual practice in the sequential order of the zero-th unit block. Since the number of spectrum data existing at every unit blocks is determined in advance by the format, it becomes possible to associate data with each other by the above-mentioned bit assignment information. Incidentally, the unit block in which the bit assignment is zero is not recorded.

After the above-mentioned spectrum data, the above-mentioned scale factor is written in a dual writing fashion and the bit assignment information is written in a dual writing fashion. In this recording method, the correspondence of the number is made corresponding to the dual writing information shown in FIG. 12 and others are similar to those of the scale factor information and the bit assignment information.

In FIG. 7, the scale factor dual writing and/or bit assignment information dual writing may be removed and the resultant extra bits may be assigned to the spectrum data area.

With respect to the last 2 bytes, as shown in FIG. 7, information of zero-th byte and first byte are written in a dual writing fashion. The dual writing of the two bytes is determined as the format, and the amount of the dual writing cannot be changed like the dual writing of the scale factor information and the dual writing of the bit assignment information.

That is, in the bit assignment calculation circuit 118 shown in FIG. 1, the system shown in FIG. 3 outputs data in which MDCT output spectrum is processed by sub-information as main information and outputs scale factor indicating state of block floating and word length indicating word length as sub-information. Based on the above-mentioned data, the scale factor and the word length, the adaptive bit assignment encoding circuits 106, 107, 108 execute the re-quantization in actual practice, and encode data in accordance with the encoding format.

Figure 9:
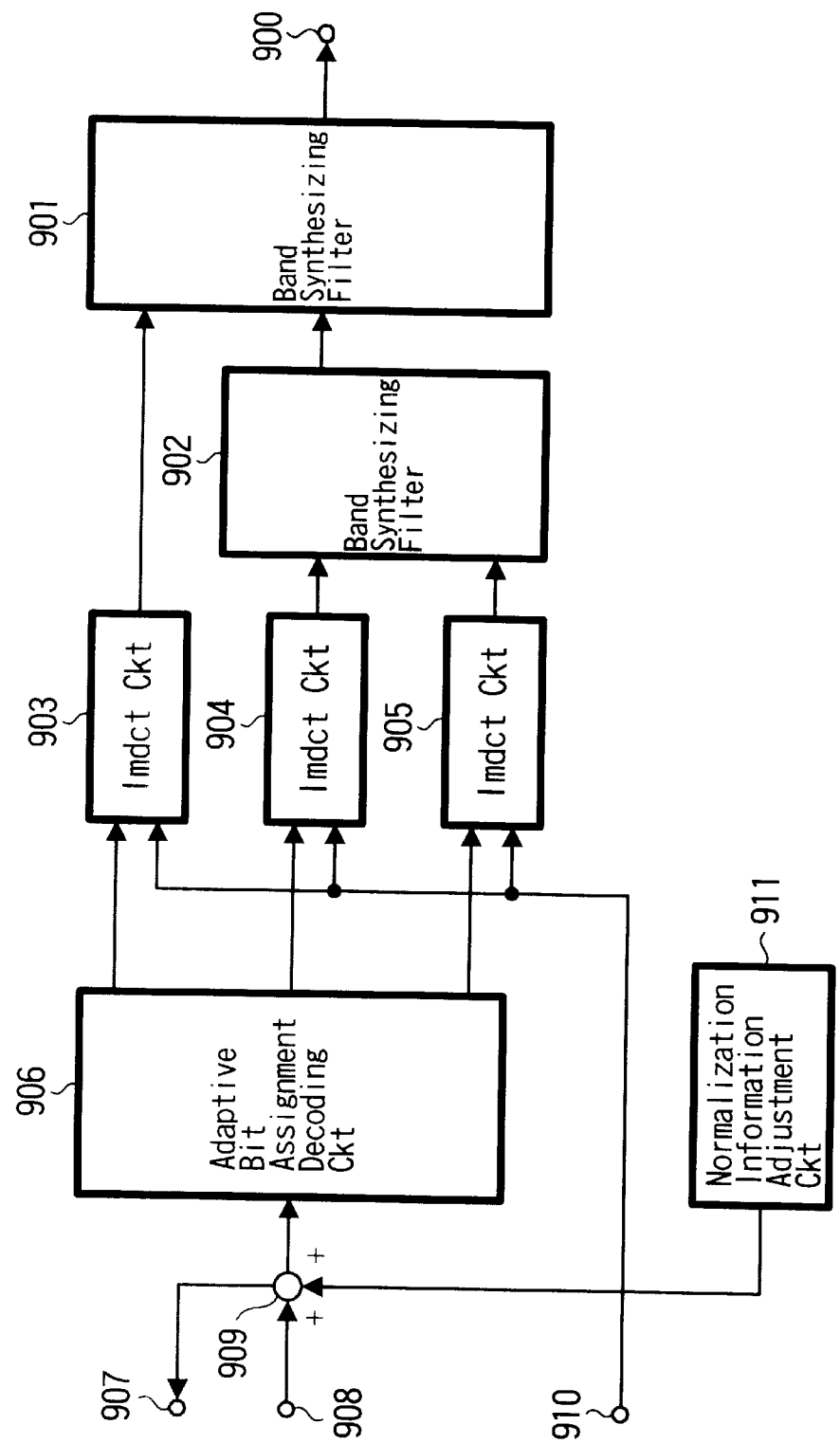
FIG. 9 is a block diagram showing a specific example of a high-efficiency compression codes signal decoder.

FIG. 9 shows a decoding circuit for again decoding the high-efficiency coded signal from the system shown in FIG.

1. Quantized MDCT coefficients of the respective bands, i.e. data equivalent to the output signals of the output terminals 112, 114, 116 shown in FIG. 1 are supplied to a decoding circuit input terminal 908 in FIG. 9. Block size information which are information compression parameters used, i.e. data equivalent to the output signals of the output terminals 113, 115, 117 are supplied to the input terminal 910. In the adaptive bit assignment decoding circuit 906 shown in FIG. 9, the bit assignment is released by using adaptive bit assignment information. Then, in the IMDCT (Inverted Modified Discrete Cosine Transform) circuits 903, 904, 905 shown in FIG. 9, the signal on the frequency axis is transformed into the signal on the time axis. The time axis signals of these partial bands are decoded into the whole band signals by band-synthesizing filters, i.e. IQMF (Inverted Quadrature Mirror Filter) circuits 902, 901 which are inverse band-dividing filters.

The normalization information adjustment circuit 911, which will be described below, acts fundamentally similarly to the normalization information adjustment circuit 119 shown in FIG. 1. That is, the normalization information adjustment circuit 911 is the circuit which outputs numerical values for level adjustment by adding and subtracting unit block to normalization information at every two-dimensional block. Also, an adder 909 is an adder for adding numerical values from the normalization information adjustment circuit 911 to sub-information indicating the scale factor of the unit block. When the numerical value outputted from the normalization information adjustment circuit 911 is negative, the adder 909 acts as the subtracter. That is, similarly to the case of the encoding, all the same numerical values from the normalization information adjustment circuit 911 are added to and subtracted from normalization information with respect to all unit blocks, thereby making it possible to adjust the level at 2 dB each. With respect to the block that is to be level-adjusted, numerical values are outputted from the normalization information adjustment circuit 911 at every two-dimensional block and added to and subtracted from the normalization information, thereby making it possible to independently adjust the level at 2 dB each. In the above-mentioned case, the added and subtracted results are limited in such a manner that the numerical values fall within the range of the numerical values of the scale factor determined by the format. The scale factor value that is level-adjusted by the adder 909 is used in the decoding process executed after the adaptive bit assignment decoding circuit 906 and can be used to level-adjust the decoding signal. Also, for example, the scale factor value may be read out from a recording medium (not shown), the adjusted scale factor value may be outputted to the terminal 907, and thereby the scale factor value recorded on the recording medium may be re-recorded as the adjusted scale factor value. Information recorded on the recording medium may be changed and re-recorded according to the need. Therefore, by the very simple system, level information recorded on the recording medium can be changed. Also, as described above, the level adjustment is independently executed at every two-dimensional blocks, thereby making it possible to realize a so-called filter effect.

While both of the encoding circuit and the decoding circuit include the normalization information adjustment circuits as described above, the present invention is not limited thereto and the filter effect can be sufficiently demonstrated only the decoding circuit.

Embodiments in which the level is adjusted by using the normalization information adjustment circuit will be described below. For example, by progressively increasing or decreasing the output value from the normalization information adjustment circuit, it becomes possible to obtain so-called fade-in and fade-out which are known as the processing of the audio signal. Also, by designating a part of the audio signal, e.g. period in which the recording level is low and cannot be heard without difficulty and adding the output value from the normalization information adjustment circuit to the corresponding period, it is possible to increase only the level of the corresponding period. Conversely, by designating a period in which the recording level is too high, it is possible to lower only the level of the corresponding period.

Moreover, with respect to an audio signal of a certain piece of music, by analyzing the magnitude of normalization information on the whole, the level adjustment can be carried out and so-called compressor and limiter effects can be achieved.

Specific examples in which the filter effect can be achieved by using the normalization information adjustment circuit will be described below.

For example, the output value from the normalization information adjustment circuit is set to the block of high band and normalization information of high-band block is decreased, thereby making it possible to realize the low-pass filter.

Conversely, for example, the output value from the normalization information adjustment circuit is set to the block of low band and normalization information of low-band block is decreased, thereby making it possible to realize a high-pass filter.

Similarly, it is clear that the bandpass filter effect and the comb filter effect can be realized within a range of values that the block can take.

The output value from the normalization information adjustment circuit is set to the block of the band outside the predetermined band and normalization information of the block of the band outside the predetermined band is decreased, thereby making it possible to realize a bandpass filter.

Also, by increasing normalization information based on the output value from the normalization information adjustment circuit, it is possible to realize the boost processing within a range of values that the block can take.

Also, when a digital signal is a digital stereo signal, with respect to independent digital signals of every channel, normalization information of all blocks are decreased relative to only one channel, whereby a localization is changed and a balance processing can be carried out.

Moreover, by progressively changing the frequency on which the filter effect is achieved, i.e. block using the time as the parameter, it is possible to realize a wow effect which is a kind of effect processing used in the musical instruments.

Figure 10:
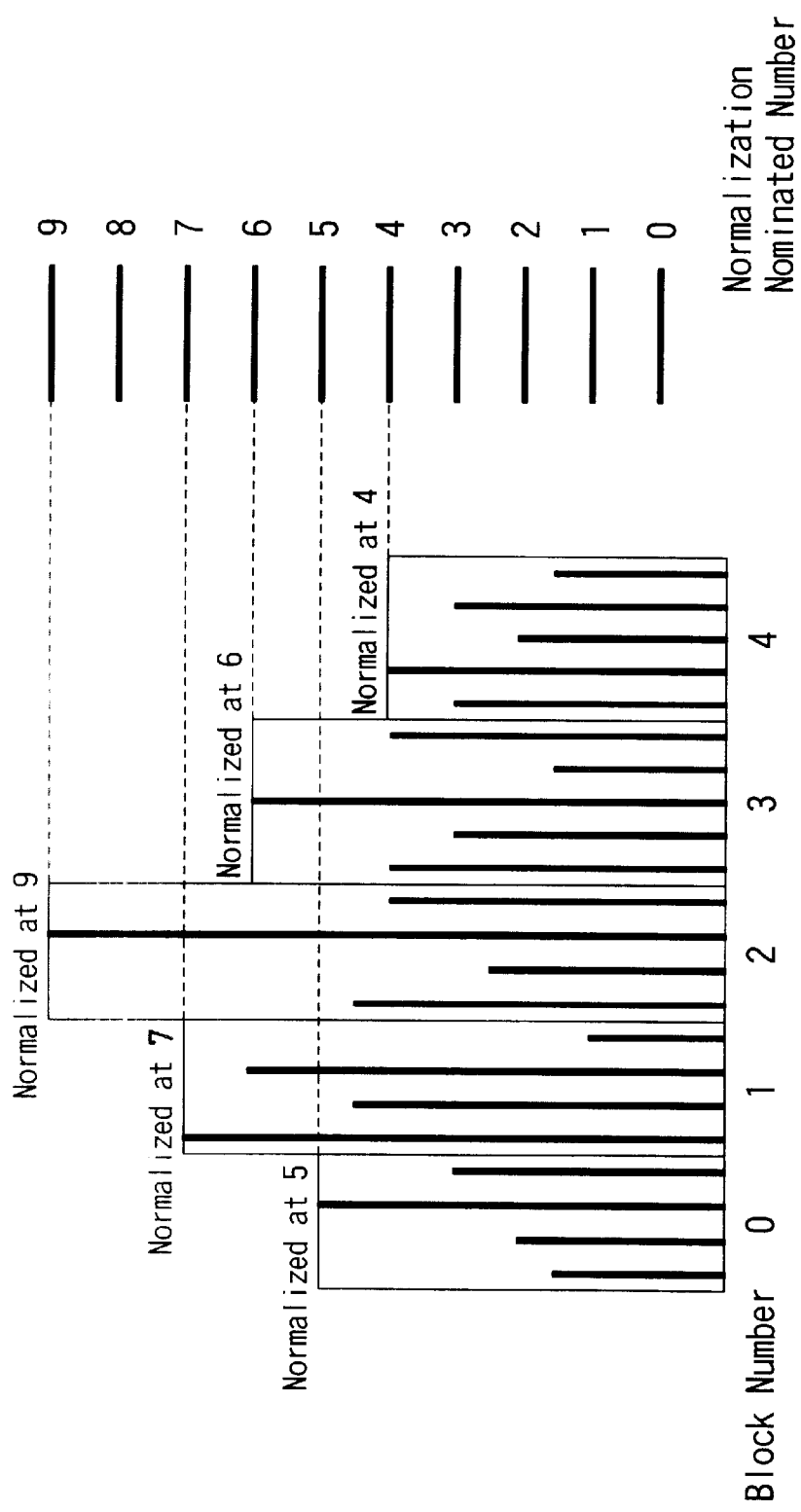
FIG. 10 is a diagram used to explain a low-pass filter.

Next, a filter will be described with reference to FIGS. 10 and 11 in which a low-pass filter is referred to as an example. FIG. 10 shows the manner in which normalization is effected at very unit block. That is, the maximum spectrum data on the frequency axis within the unit block or normalization nominated information corresponding to MDCT coefficient which is the signal component within the two-dimensional block concerning the time and the frequency is selected and the selected normalization nominated number becomes normalization information of the corresponding unit block. In FIG. 10, normalization information of the unit block in which the block number is 0 becomes 5, normalization information of the unit block in which the block number is 1 becomes 7, normalization information of the unit block in which the block number is 2 becomes 9, normalization information of the unit block in which the block number is 3 becomes 6, and normalization information of the unit block in which the block number is 4 becomes 4. Since the encoded data have these normalization information, upon decoding, it is general that the decoding is executed based on these normalization information.

Figure 11:
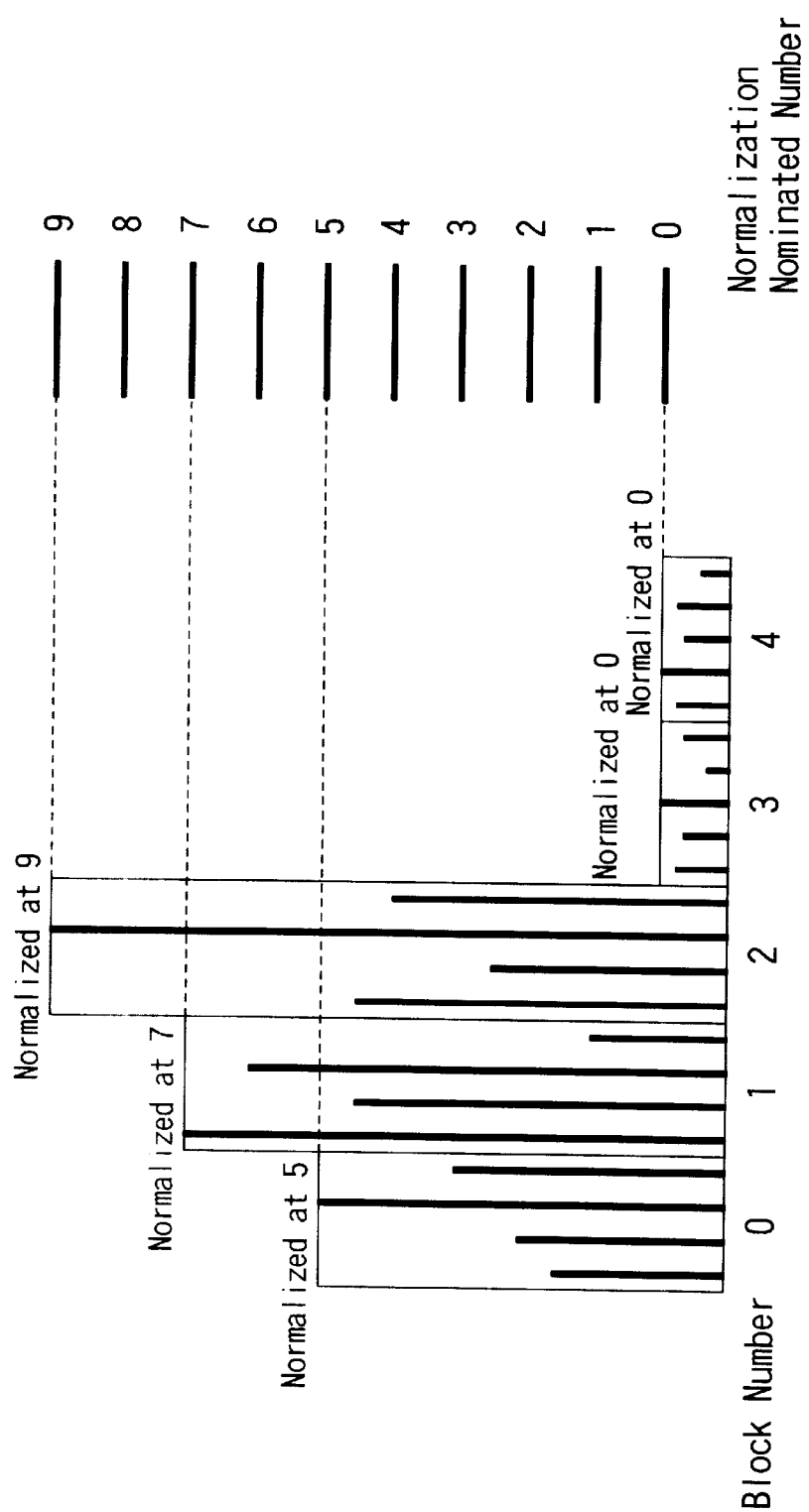
FIG. 11 is a diagram used to explain a low-pass filter.

On the other hand, FIG. 11 shows the manner in which the maximum spectrum data on the frequency axis within the unit block or normalization information determined based on the MDCT coefficient are forced to be changed. The normalization information can be forced to be changed either upon encoding or decoding. An example in which normalization information is forced to be changed when encoded data recorded on the recording medium is decoded will be described. While the encoded data recorded on the recording medium in actual practice is illustrated in FIG. 10, normalization information is forced to be set to 0 with respect to the unit blocks in which the block numbers, for example, are 3 and 4 relative to the encoded data. This can be realized by adding the negative value to the normalization information in which the block numbers are 3 and 4 before the decoding, for example, is executed. If the above-mentioned operation is carried out, the unit blocks in which the block numbers are 3 and 4 are decoded under the condition that they are normalized by the normalization nominated number 0. As a consequence, since the unit blocks in which the block numbers are 3 and 4 are decoded based on the normalization nominated number 0 of the lowest level, the spectrum data on the frequency axis or the MDCT coefficient is decoded as the data of low level. If the unit block in which the block number is larger contains a higher frequency component, then this operation is equivalent to the case in which the level of the high frequency component is cut. That is, normalization information in which the unit block numbers are 3 and 4 are forced to be 0, thereby making it possible to realize a low-pass filter.

In the examples shown in FIGS. 10 and 11, the number of the unit blocks is 5 ranging from 0, 1 to 5, and the number of normalization nominated numbers is 10 ranging from 0, 1 to 9. According to the format used in the mini disc, for example, the number of unit blocks is 52 ranging from 0, 1 to 51, and the number of normalization nominated numbers is 64 ranging from 0, 1 to 64, thereby making it possible to effect a finer control. In the above-mentioned case, if normalization information of the unit blocks succeeding 20, for example, are set to 0, thereby making it possible to realize a low-pass filter in which a cutoff frequency is approximately 5.5 kHz.

Then, embodiments of the digital signal recording apparatus, the digital signal reproducing apparatus, the digital signal transmission apparatus and the digital signal reception apparatus including the above-mentioned normalization adjustment circuit will be described with reference to FIGS. 12A, 12B, 13, 14 and FIG. 15.

In FIGS. 12A, 12B, 13, 14 and FIG. 15, reference letter CPU denotes a microcomputer, and KEY denotes an input key provided in the apparatus or an input key of a remote controller.

Further, an encoder ENC shows a portion which results from removing adders 120, 121, 122 and the normalization adjustment circuit 119 from the encoder shown in FIG. 1. Tin denotes an input terminal 100. A decoder DEC shows a portion which results from removing an adder 909 and a normalization adjustment circuit 911 from the decoder shown in FIG. 9. Tout denotes an output terminal 900.

Figure 12A:
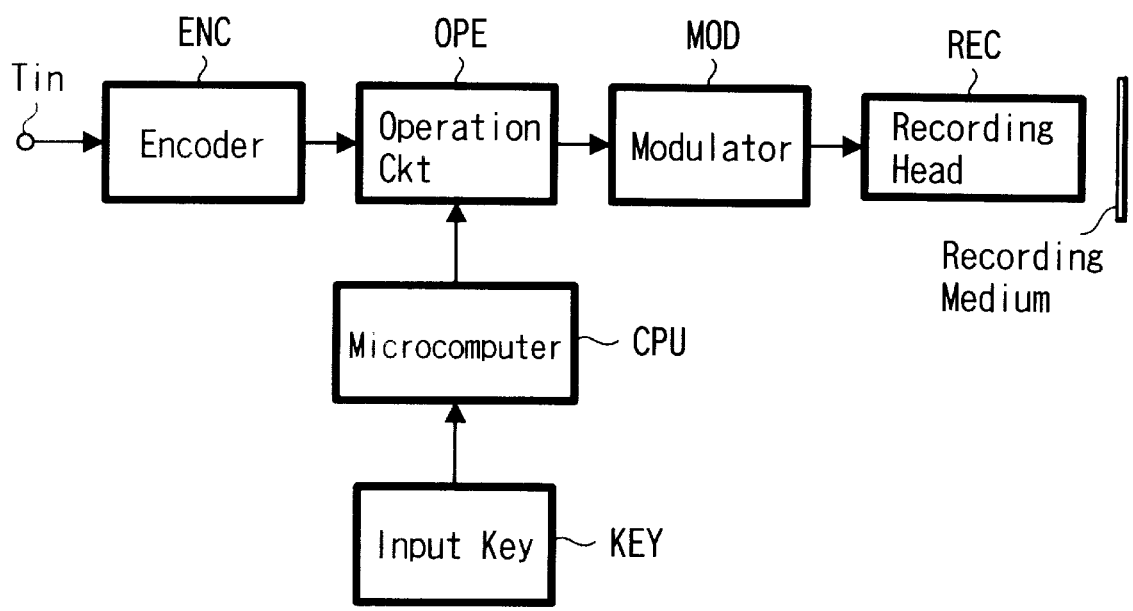
FIG. 12A is a block diagram showing a specific example of a recording apparatus according to the present invention.
Figure 12B:
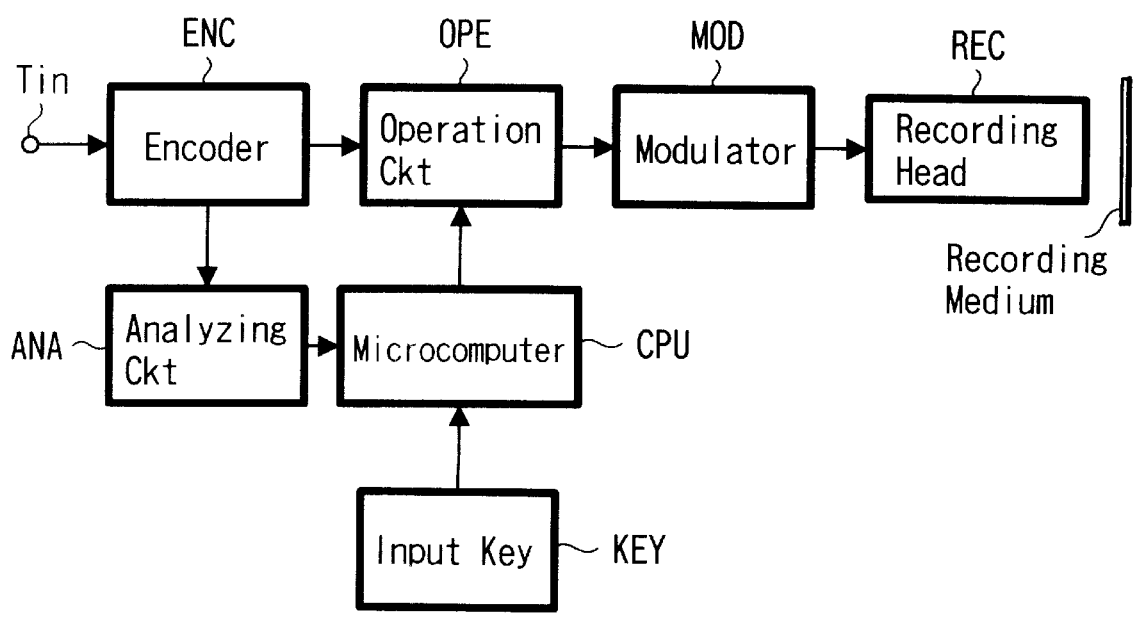
FIG. 12B is a block diagram showing an example in which the levels are analyzed in the specific example of the recording apparatus according to the present invention.
Figure 13:
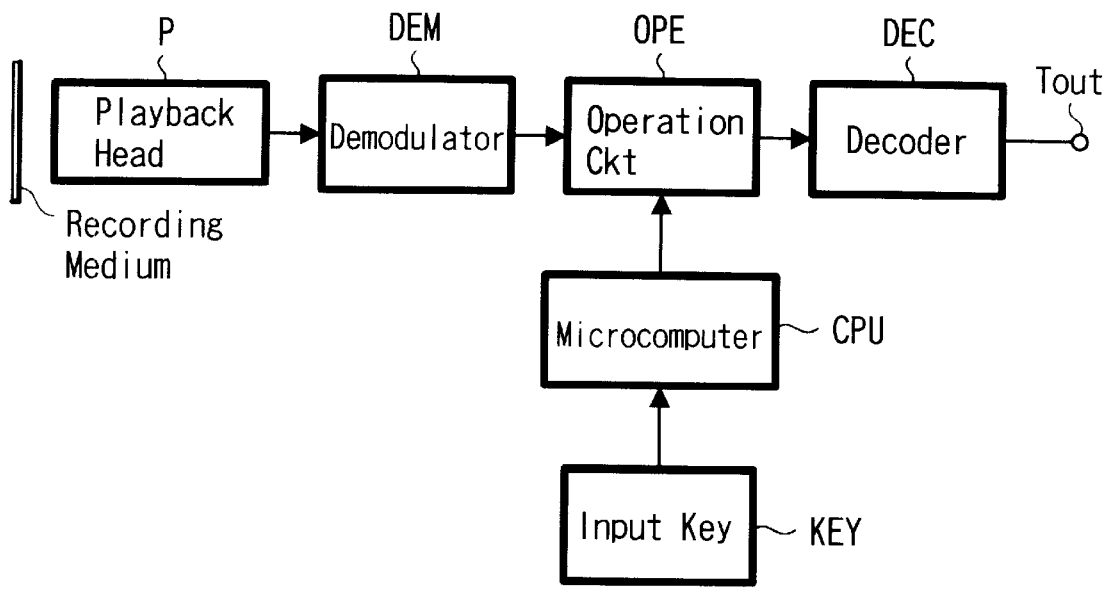
FIG. 13 is a block diagram showing a specific example of a reproducing apparatus according to the present invention.
Figure 14:
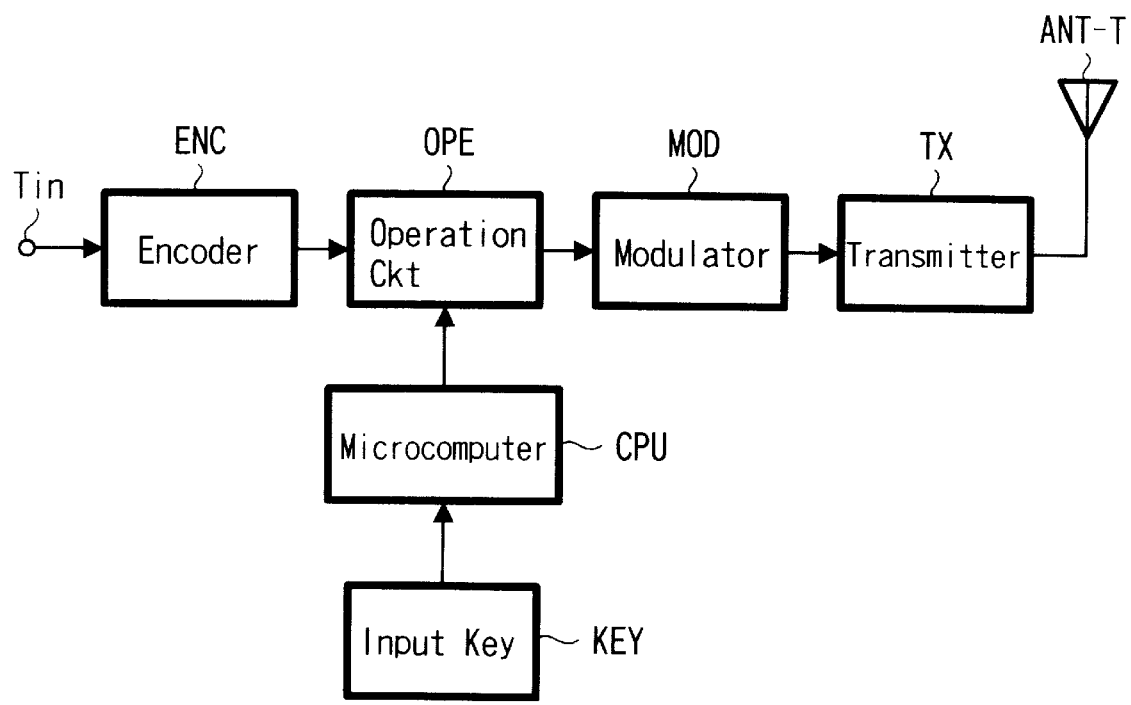
FIG. 14 is a block diagram showing a specific example of a transmission apparatus according to the present invention.
Figure 15:
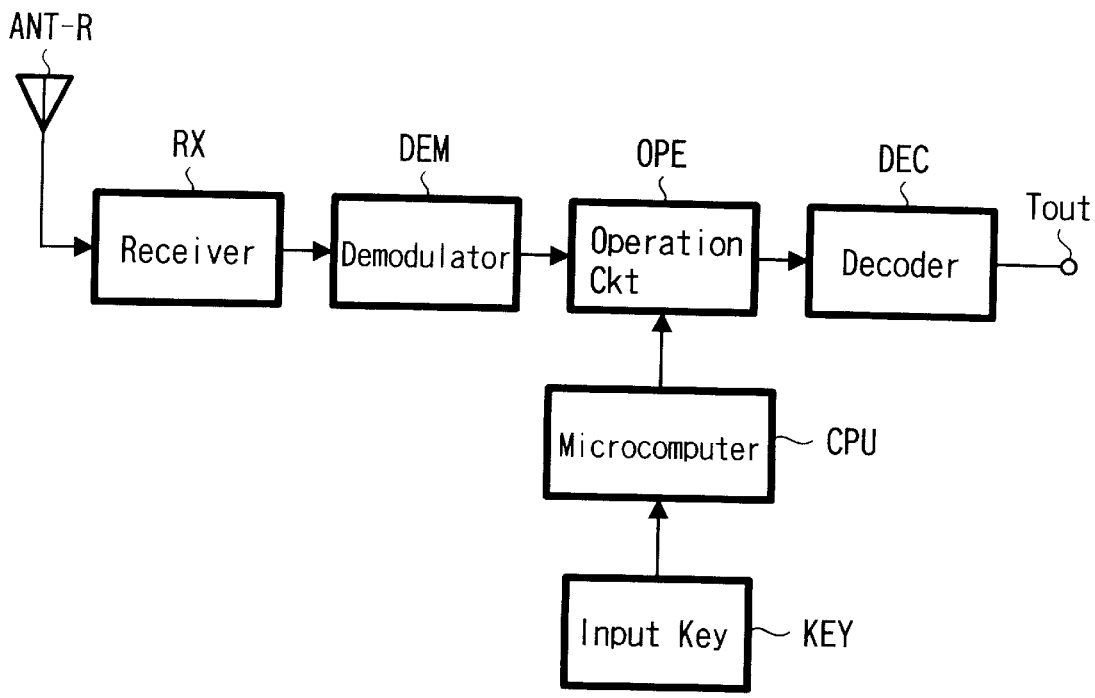
FIG. 15 is a block diagram showing a specific example of a reception apparatus according to the present invention.

In FIGS. 12A, 12B and 14, an operation circuit OPE denotes, of the encoder shown in FIG. 1, the adders 120, 121, 122 and the normalization adjustment circuit 119. In FIGS. 13 and 15, the operation circuit OPE denotes, of the decoder shown in FIG. 9, the adder 909 and the normalization adjustment circuit 911.

In the recording apparatus shown in FIG. 12A, an inputted digital signal from the input terminal Tin is supplied to the encoder ENC, in which it is encoded, and an encoded output is supplied to the operation circuit OPE.

When a user enters data instructing a function for changing acoustic characteristics from the input key KEY, the microcomputer CPU controls the operation circuit OPE to execute a necessary computation in accordance with the instruction from the input key KEY. Outputs of the operation circuit OPE, i.e. outputs 112, 14, 116 of FIG. 1 and the outputs 113, 115, 117 from the block determining circuit are supplied to the modulator MOD, in which they are multiplexed and modulated in a predetermined manner or respective outputs are modulated and then multiplexed or re-modulated. The modulated signal from the modulator MOD is recorded on a recording medium M by a recording head REC comprising a magnetic head and an optical head.

Further, FIG. 12B shows an example of a recording apparatus including an analyzing circuit ANA for analyzing level of normalization information from the modulator MOD. The analyzing circuit ANA analyzes the level of the normalization information, and the level information is transmitted to the microcomputer CPU. The microcomputer CPU controls the operation circuit OPE for the computation for realizing the compressor or limiter in accordance with the level information and the operation of the user input key KE.

In the reproducing apparatus shown in FIG. 13, the recorded signal is reproduced by a reproducing head P from the recording medium M shown in FIG. 10. A demodulator DEM demodulates the reproduced signal in response to the modulation executed by the modulator MOD.

The demodulated outputs from the demodulator DEM, i.e. signals equivalent to the outputs from the output terminals 112, 114, 116 of the encoder shown in FIG. 1 are supplied to the input of the operation circuit OPE, i.e. the input terminal 908 of the encoder shown in FIG. 9. At the same time, signals equivalent to the outputs from the output terminals 113, 115, 117 of the encoder shown in FIG. 1 are supplied to the input terminal 910 of FIG. 9.

A user enters data instructing the function to change the acoustic characteristics from the input key KEY. The microcomputer CPU controls the operation circuit OPE for executing a necessary computation in accordance with the instruction from the input means.

The decoder DEC executes decoding in response to the output from the operation circuit OPE and the signal supplied to the input terminal 910 of FIG. 9, and outputs an output digital signal corresponding to the input digital signal from the input terminal Tin at the output terminal Tout.

In the transmission apparatus shown in FIG. 14, the input digital signal from the input terminal Tin is supplied to the encoder ENC, in which it is encoded. The output from the encoder ENC is supplied to the operation circuit OPE. A user enters data instructing the function to change the acoustic characteristics from the input key KEY. The microcomputer CPU controls the operation circuit OPE for executing a necessary computation in accordance with the instruction from the input means.

The outputs of the operation circuit, i.e. the outputs 112, 114, 116 of FIG. 1 and the outputs 113, 115, 117 from the block determining circuits are supplied to the modulator MOD, in which they are multiplexed and then modulated in a predetermined manner or the output signals are modulated and then multiplexed or re-modulated. The modulated signal from the modulator MOD is supplied to a transmitter TX, in which it is frequency-converted and amplified and thereby converted into a transmission signal. The transmission signal is transmitted by a transmission antenna ANT-T which is a part of the transmitter TX.

In the reception apparatus shown in FIG. 15, the transmission signal from the transmission antenna ANT-T shown in FIG. 11 is received by a reception antenna ANT-R which is a part of the receiver RX. The reception signal is amplified and inversely frequency-converted by the receiver RX. The reception signal from the receiver RX is demodulated by the demodulator DEM in response to the modulation executed by the modulator MOD.

The demodulated outputs from the demodulator DEM, i.e. signals corresponding to the outputs from the output terminals 112, 114, 116 of the encoder of FIG. 1 are supplied to the input of the operation circuit OPE, i.e. the input terminal 908 of the decoder shown in FIG. 9. At the same time, signals equivalent to the outputs from the output terminals 113, 115, 117 of the encoder shown in FIG. 1 are supplied to the input terminal 910 shown in FIG. 9.

A user enters data instructing the function to change the acoustic characteristics from the input key KEY. The microcomputer CPU controls the operation circuit OPE for executing a necessary computation in accordance with the instruction from the input means.

The decoder DEC executes decoding in response to the output from the operation circuit OPE and the signal supplied to the input terminal 910 shown in FIG. 9 and outputs an output digital signal corresponding to the input digital signal from the input terminal Tin at the output terminal Tout.

Figure 16:
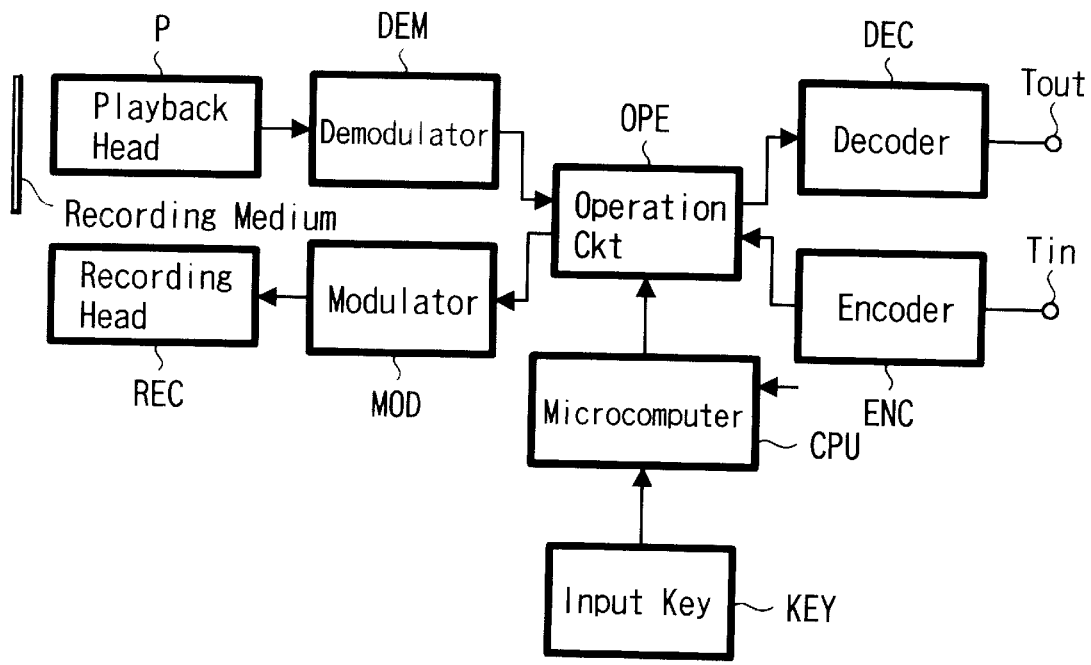
FIG. 16 is a block diagram showing a specific example of a reproducing and recording apparatus according to the present invention.

Then, an example of a reproducing and recording apparatus will be described with reference to FIG. 16.

In the reproducing and recording apparatus according to the present invention, the recorded signal reproduced from the recording medium M by the playback P is demodulated by the demodulator DEM and data compressed by the ATRA system, for example, corresponding to the encoder output terminals 112, 114, 116 of FIG. 1 are obtained. The compressed data is inputted to the operation circuit OPE comprising the adder 909 and the normalization information adjustment circuit 911 of FIG. 9, in which a desired computation is effected on the normalization information and supplied to the decoder DEC, thereby decoded.

A user enters data instructing the function to change the acoustic characteristics from the input key KEY. The microcomputer CPU controls the operation circuit OPE for executing a necessary computation in accordance with the instruction from the input means.

Further, in response to the operation of the input key KEY, the microcomputer CPU stores an address in which the computed compression data is recorded in a memory, not shown. The address stored in the memory is stored in an address using pre-grooves in an MD, for example.

In the reproducing and recording apparatus according to the present invention, the compression data in which the necessary computation is effected on the normalization information by the operation circuit OPE is supplied directly to the modulator MOD bypassing the decoder DEC, and recorded on the recording medium M through a recording head REC. That is, through a short loop comprising the recording medium M, the reproducing head P, the demodulator DEM, the operation circuit OPE, the modulator MOD, the recording head REC and the recording medium M, in that order, the compression decoding/encoding is not executed but a desired processing is executed on the recording signal on the recording medium, and the overwriting is carried out using the address stored in the memory as a starting point.

Further, according to the present invention, since the processed content is recorded on then recording medium M, even when the recording medium is reproduced by other reproducing equipment, there can be obtained data having changed acoustic characteristics.

The present invention is not limited to the above-mentioned embodiments and various modifications and variations can be made. The encoder and the decoder may be either separately provided or may be integrally formed. The recording apparatus and the reproducing apparatus may be either separately provided or may be integrally formed. As the recording medium, there may be used a magnetic tape, a magnetic disk, a magneto optical disk or the like. Further, the recording medium may be replaced with memory means such as IC memory and memory card. A transmission line between the transmission apparatus and the reception apparatus may be established by light such as infrared rays or radio transmission line such as radio waves or wire transmission line such as conductors and optical cables. The input digital signal is the digital audio signal, and as the audio signal, there may be used a variety of sound signals such as voices, songs and sounds of musical instruments. Further, the digital audio signal also is possible. The present invention can be applied to the digital signal recording and reproducing method or apparatus, the digital signal transmission and reception method or apparatus and the digital signal reception method or apparatus or the like.

In the specific example according to the present invention, with respect to the level adjustment effect or the filter effect achieved by the adjustment of the normalization information, there have been described the methods of WMF band-limiting and the coding system using the quadrature transform based on the MDCT. However, the present invention is not limited to the encoding system using the QMF and the MDCT processing. Fundamentally, as long as the encoding system is of the system in which the quantization is similarly carried out by normalization information and bit assignment information, even in the case of the subband coding using a filter band or the like, for example, it is apparent that the level adjustment effect or the filter effect can be realized by using a similar method.

According to the present invention, it is needless to say that the volume processing and the filter processing are effected on then reproduced digital signal upon reproduction, Upon encoding, if the above-mentioned processing is effected on the digital signal, then it becomes possible to record the digital signal on the recording medium under the condition that a desired effect such as the volume processing or the filter processing is reflected on the digital signal. That is, not only music information from other sound source can be processed in a desired processing fashion and recorded on the recording medium but also data reproduced from the recording medium can be processed in a desired processing fashion and then re-recorded on the recording medium.

Further, according to the present invention, since the normalization information of every unit block is added or subtracted prior to the ATRAC decoding processing, it becomes possible to execute the volume processing or the filter processing by adding the adder or the adder which becomes the subtracter when the positive value or the negative value is added.

For example, when spectrum data is directly computed after compression data was restored to spectrum data, inputted digital data on the time axis is processed in an MDCT fashion and computed and then compressed. Therefore, it is necessary to add a circuit for computing the spectrum data during the processing of the ATRAC decoder, and hence the ATRAC decoder should be modified. According to the present invention, since data is decoded by the ATRAC decoder and the addition or the subtraction is effected on the normalization information, the ATRAC decoder may be the original one and need not be modified as described above.

In the case of the encoding, similarly, after the encode processing, the volume processing or the filter processing can be made by the computation based on the adder. Thus, the addition of the circuit for effecting the computation during the processing of the ATRAC encoder is not required, and hence the ATRAC encoder need not be modified.

A reproducing and recording method will be described with reference to a flowchart of FIG. 17.

Figure 17:
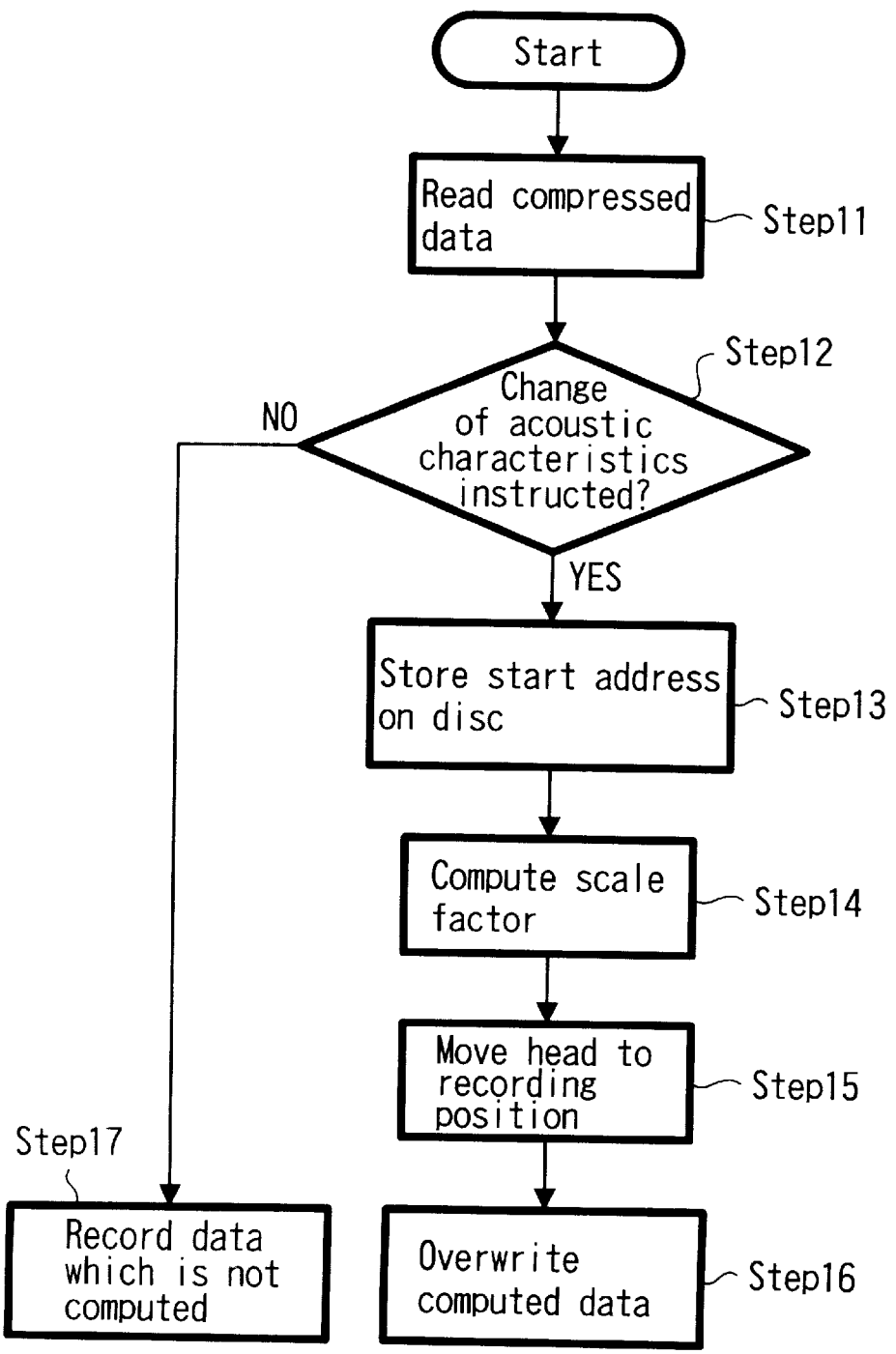
FIG. 17 is a flowchart to which reference will be made in explaining a specific example of a reproducing and recording method according to the present invention.

Referring to FIG. 17, following the start of operation, control goes to a step 11, whereat compressed digital data including spectrum data, band-divided on the frequency axis, and scale factor of every divided band is read out from the recording medium. Then, control goes to the next decision step 12, whereat it is determined whether or not the change of acoustic characteristics is instructed by a user when the user operates the key. If the change of acoustic characteristics is instructed as represented by a YES at the decision step 12, then control goes to a step 13, whereat a starting address of data whose acoustic characteristics are to be changed is stored in the memory. Control goes to a step 14, whereat a computation for changing the acoustic characteristics of the compressed digital data is effected on the scale factor of each divided band of the compressed digital data having the band-divided spectrum data on the frequency axis in which the change of the acoustic characteristics was instructed and the scale factor of every divided band. At a step 15, the recording head comprising the magnetic head and the optical head, for example, is moved based on the starting address stored at the step 13. At a step 16, by effecting a computation on the scale factor of every band, the compressed digital data whose acoustic characteristics are changed is overwritten from the starting address. If the change of the acoustic characteristics is not instructed as represented by a NO at the decision step 12, then control goes to a step 17, wherein compressed digital data, which is not computed, can be recorded one more time.

A decoding method will be described with reference to a flowchart of FIG. 18.

Figure 18:
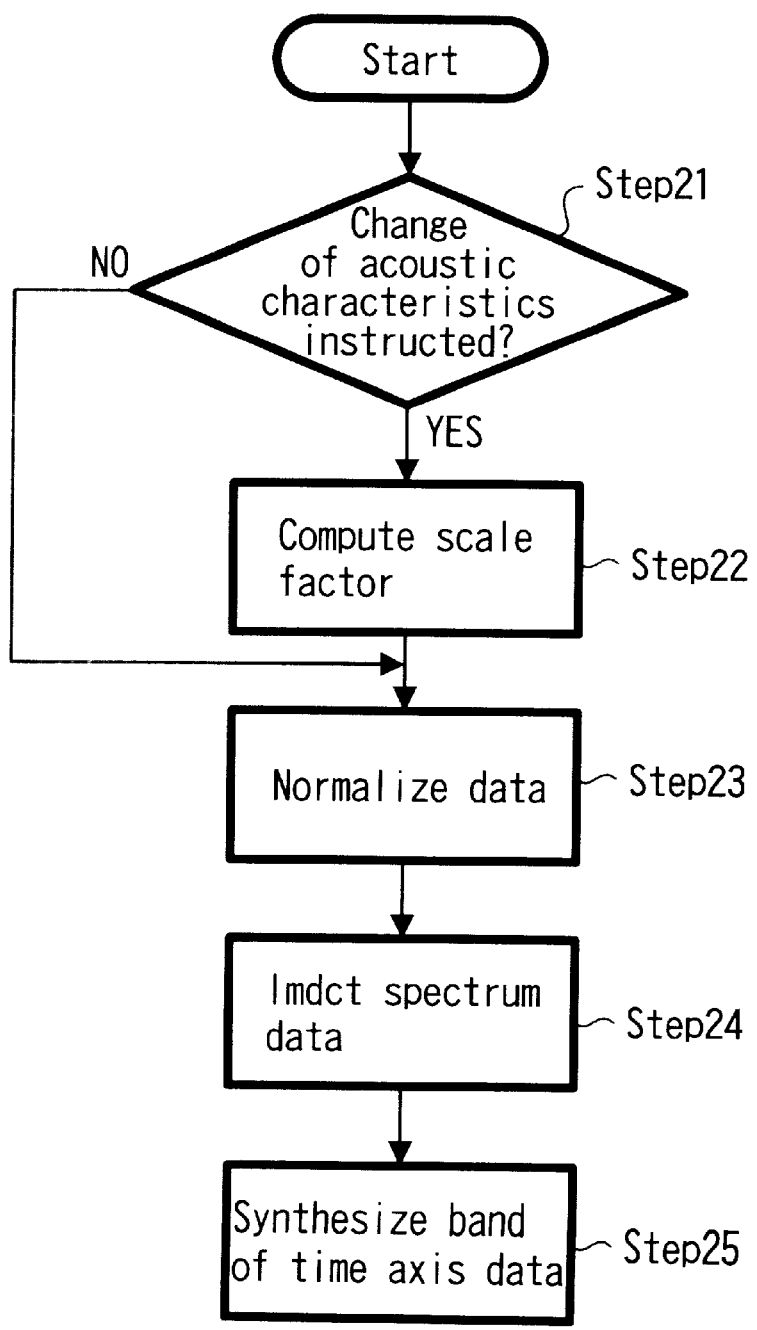
FIG. 18 is a flowchart to which reference will be made in explaining a specific example of a decoding method according to the present invention.

Referring to FIG. 18, and following the start of operation, it is determined at the next decision step 21 whether or not the change of acoustic characteristics is instructed by a user when the user operates the key. If the change of acoustic characteristics is instructed as represented by a YES at the decision step 12, then control goes to a step 22. If the change of acoustic characteristics is not instructed as represented by a NO at the decision step 21, then control goes toe a step 23. In the step 22, a predetermined computation is effected on the scale factor of each divided band of the compressed digital data having the band-divided spectrum data on the frequency axis in which the change of the acoustic characteristics was instructed and the scale factor of every divided band. In the step 23, based on the scale factor of every divided band thus computed, there is normalized the band-divided spectrum data in the compressed digital data. In the step 24, digital data on the band-divided time axis is obtained by processing the band-divided spectrum data thus normalized in an IMDCT fashion. In the next step 25, band-divided digital data on the time axis are synthesized in band.

A recording method will be described with reference to a flowchart of FIG. 19.

Figure 19:
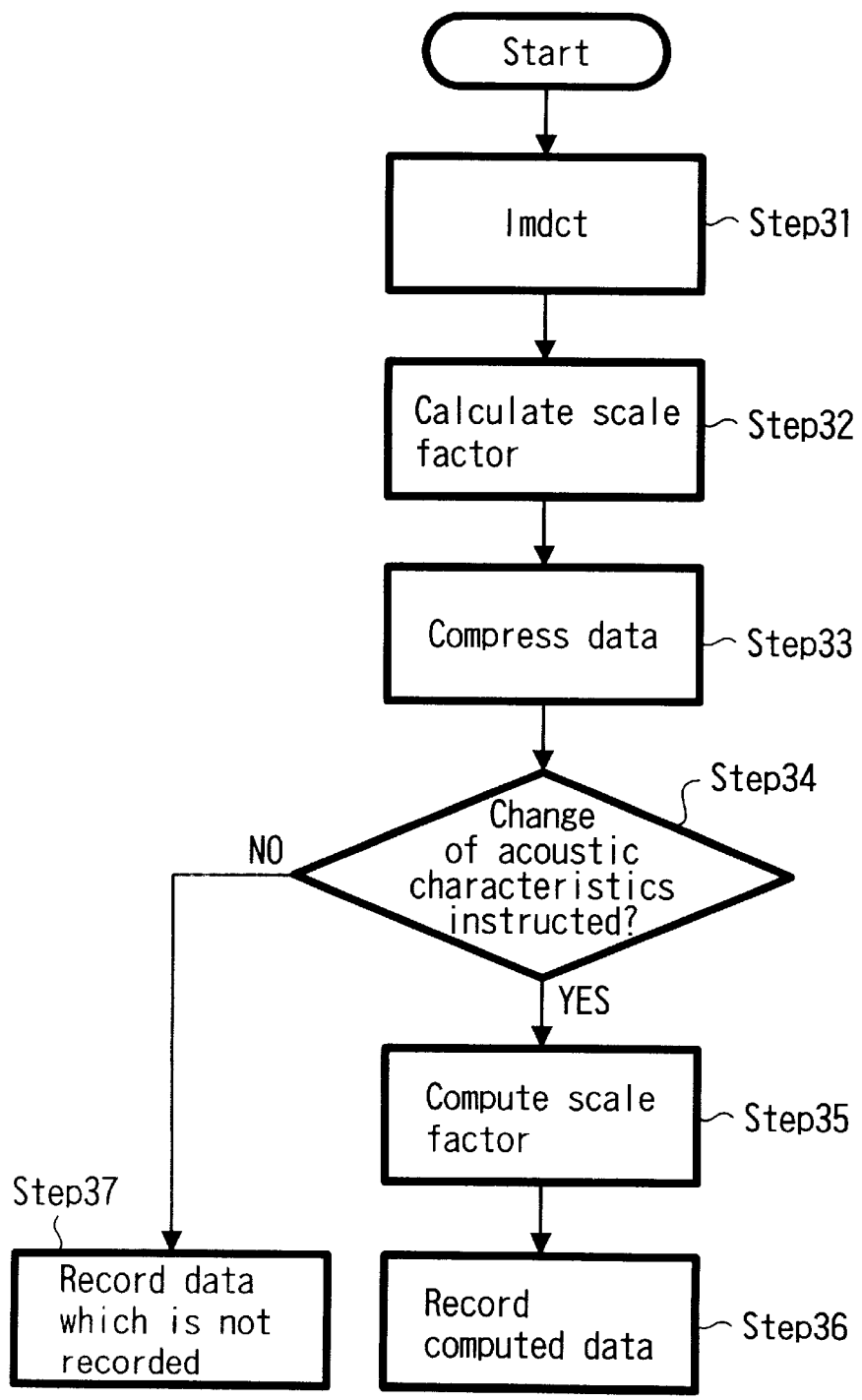
FIG. 19 is a flowchart to which reference will be made in explaining a specific example of a recording method according to the present invention.

Referring to FIG. 19, and following the start of operation, at a step 31, a DCT is effected to transform the inputted digital signal on the time axis into the spectrum data on the frequency axis. At a step 32, the spectrum data on the frequency axis is band-divided into a plurality of bands, and a scale factor of every divided band used for normalization is computed. At a step 33, in response to the calculated scale factor of every divided band, the spectrum data thus band-divided on the frequency axis is compressed and thereby transformed into compressed digital data including the scale factor of every divided band and the spectrum data. At the next decision step 34, it is determined whether or no the change of acoustic characteristics is instructed when a user operates the input key. If the change of acoustic characteristics is instructed as represented by a YES at the decision step 34, then control goes to a step 35. If on the other hand the change of acoustic characteristics is not instructed as represented by a NO at the decision step 34, then control goes to a step 37. In the step 35, the compressed digital data including the scale factor of every divided band and the spectrum data is inputted and a computation for changing the acoustic characteristics of the compressed digital data is effected on the scale factor of every divided band. In a step 36, the compressed digital data in which the acoustic characteristics are changed by the computation on the scale factor of every band is recorded on the recording medium. If the change of acoustic characteristics is not changed as represented by a NO at the decision step 34, then control goes to the step 37, whereat compressed digital data, which is not computed, is recorded.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A reproducing and recording apparatus comprising:

data read means for reading compressed digital data including spectrum data whose band is divided into a plurality of bands on a frequency axis and a scale factor of every divided band from a recording medium;

computation means for receiving compressed digital data including said band-divided spectrum data and the scale factor of every divided band from said data read means and effecting a computation for changing acoustic characteristics of said compressed digital data; and recording means for re-recording said compressed digital data whose acoustic characteristics are changed when said computation means computes the scale factor of said every band on said recording medium.

2. The apparatus of claim 1, further comprising:

normalization means for normalizing said band-divided spectrum data contained in said compressed digital data based on the scale factor of said every divided band received by said computation means;

IMDCT means for obtaining band-divided digital data on a time axis by processing said band-divided spectrum data normalized by said normalization means in an IMDCT fashion; and band-synthesizing means for band-synthesizing said digital data on the time axis band-divided by said IMDCT means.

3. The apparatus as claimed in claim 2, wherein said computation means executes a predetermined computation to change acoustic characteristics of said digital data on the time axis band-synthesized by said band-synthesizing means.

4. The apparatus as claimed in claim 2, wherein digital data on a time axis band-synthesized by said band synthesizing means is a digital audio signal comprising a plurality of independent channels and said computation means changes a localization of the digital audio signal comprising said plurality of independent channels by effecting a computation on at least one channel of said independent channels.

5. The apparatus as claimed in 1, wherein said computation means effects uniformly a computation on all of said scale factors of said every divided band.

6. The apparatus as claimed in claim 1, wherein said computation means effects a computation on at least one of said scale factors of said every divided band.

7. The apparatus as claimed in claim 1, wherein said computation means executes a filter processing by relatively changing a scale factor corresponding to one band of said plurality of bands and a scale factor corresponding to other band.

8. The apparatus as claimed in claim 7, wherein one of said plurality of bands has a frequency band higher than that of other band and said computation means executes a low-pass processing by effecting a computation such that a scale factor corresponding to one band of said plurality of bands decreases relative to a scale factor corresponding to other band.

9. The apparatus as claimed in claim 7, wherein one band of said plurality of bands has a frequency band higher than that of other band and said computation means executes a high-pass processing by effecting a computation such that a scale factor corresponding to one band of said plurality of bands increases relative to a scale factor corresponding to other band.

10. The apparatus as claimed in claim 7, wherein said computation means executes a bandpass filter processing by effecting a computation such that a scale factor corresponding to one band of said plurality of bands increases relative to scale factors corresponding to other band adjoining to both sides of one band.

11. The apparatus of claim 1, wherein said compressed digital data is volume-controlled by uniformly effecting a computation on all scale factors of said every divided band.

12. The apparatus as claimed in claim 1, wherein said compressed digital data is filter-processed by effecting a computation on at least one of scale factors of said every divided band.

13. The apparatus as claimed in claim 1, wherein compressed digital data of a predetermined period is relatively changed with respect to compressed digital data of other period and recorded by effecting a computation for changing the acoustic characteristics of said compressed digital data relative to said compressed digital data of said predetermined period.

14. The apparatus according to claim 1, further comprising level analyzing means for analyzing level information of said compressed digital data and wherein said computation means effects a computation for changing said acoustic characteristics in accordance with analyzed results of said level analyzing means to thereby limit the level of said compressed digital data.

15. A reproducing and recording method comprising the steps of:

reading compressed digital data including spectrum data on a frequency axis band-divided and a scale factor of every divided band from a recording medium;

effecting a computation for changing acoustic characteristics of said compressed digital data on the scale factor of said every divided band in compressed digital data including said read out spectrum data on said frequency axis band-divided and the scale factor of every divided band; and re-recording said compressed digital data whose acoustic characteristics are changed on said recording medium by computing the scale factor of said every band.

16. The method of claim 15, further comprising the steps of:

normalizing said band-divided spectrum data contained in said compressed digital data based on the scale factor of said every divided band of said read out compressed digital data;

obtaining band-divided digital data on a time axis by processing said normalized band-divided spectrum data; and band-synthesizing said digital data on the band-divided time axis.

17. The method as claimed in claim 16, wherein said computation is a predetermined computation to change acoustic characteristics of said digital data on the band-synthesized time axis.

18. The method as claimed in claim 16, wherein digital data on a band-synthesized time axis is a digital audio signal comprising a plurality of independent channels and said computation changes a localization of the digital audio signal comprising said plurality of independent channels by effecting a computation on at least one channel of said independent channels.

19. The method as claimed in claim 15, wherein said computation is a uniform computation on all of said scale factors of said every divided band.

20. The method as claimed in claim 15, wherein said computation is a computation on at least one of said scale factors of said every divided band.

21. The method as claimed in claim 15, wherein said computation is a filter processing by relatively changing a scale factor corresponding to one band of said plurality of bands and a scale factor corresponding to other band.

22. The method as claimed in claim 21, wherein one of said plurality of bands has a frequency band higher than that of other band and said computation is a low-pass processing by effecting a computation such that a scale factor corresponding to one band of said plurality of bands decreases relative to a scale factor corresponding to other band.

23. The method as claimed in claim 21, wherein one band of said plurality of bands has a frequency band higher than that of other band and said computation is a high-pass processing by effecting a computation such that a scale factor corresponding to one band of said plurality of bands increases relative to a scale factor corresponding to other band.

24. The method as claimed in claim 21, wherein said computation is bandpass filter processing by effecting a computation such that a scale factor corresponding to one band of said plurality of bands increases relative to scale factors corresponding to other band adjoining to both sides of one band.

25. The method of claim 15, wherein said compressed digital data is volume-controlled by uniformly effecting a computation on all scale factors of said every divided band.

26. The method as claimed in claim 15, wherein said compressed digital data is filter-processed by effecting a computation on at least one of scale factors of said every divided band.

27. The method as claimed in claim 15, wherein compressed digital data of a predetermined period is relatively changed with respect to compressed digital data of other period and recorded by effecting a computation for changing the acoustic characteristics of said compressed digital data relative to said compressed digital data of said predetermined period.

28. The method according to claim 15, further comprising the step of analyzing level information of said compressed digital data; and wherein said computation changes said acoustic characteristics in accordance with the analyzed level information to thereby limit the level of said compressed digital data.

* * * * *